(12) United States Patent
Turgis et al.

(10) Patent No.: US 10,844,459 B2
(45) Date of Patent: Nov. 24, 2020

(54) PROCESS FOR EXTRACTING AND RECOVERING TANTALUM PRESENT IN AN ACID AQUEOUS PHASE BY MEANS OF AN IONIC LIQUID, AND USE OF SUCH AN IONIC LIQUID FOR EXTRACTING THE TANTALUM FROM AN ACID AQUEOUS PHASE

(71) Applicants: CENTRE NATIONAL DE LA RECHERCHE SCIENTIFIQUE, Paris (FR); UNIVERSITE DE MONTPELLIER, Montpellier (FR); UNIVERSITE DE CHAMBERY, Chambery (FR); ECOLE NATIONALE SUPÉRIEURE DE CHIMIE DE MONTPELLIER, Monpellier (FR); TND, Quesnoy sur Deûle (FR)

(72) Inventors: Raphael Turgis, Sabran (FR); Guilhem Arrachart, Saint Laurent des Arbres (FR); Stéphane Pellet-Rostaing, Villeurbanne (FR); Micheline Draye, Chambery (FR); Sophie Legeai, Metz (FR); David Virieux, Montpellier (FR); Christian Thomas, Paris (FR)

(73) Assignees: CENTRE NATIONAL DE LA RECHERCHE SCIENTIFIQUE, Paris (FR); UNIVERSITE DE MONTPELLIER, Montpellier (FR); UNIVERSITE DE CHAMBERY, Chambery (FR); ECOLE NATIONALE SUPERIEURE DE CHIMIE DE MONTPELLIER, Montpellier (FR); TND, Quesnoy sur Deule (FR); UNIVERSITE DE LORRAINE, Nancy (FR)

( * ) Notice: Subject to any disclaimer, the term of this patent is extended or adjusted under 35 U.S.C. 154(b) by 218 days.

(21) Appl. No.: 15/751,307

(22) PCT Filed: Aug. 10, 2016

(86) PCT No.: PCT/EP2016/068998
§ 371 (c)(1),
(2) Date: Feb. 8, 2018

(87) PCT Pub. No.: WO2017/025547
PCT Pub. Date: Feb. 16, 2017

(65) Prior Publication Data
US 2018/0230572 A1 Aug. 16, 2018

(30) Foreign Application Priority Data
Aug. 10, 2015 (FR) ..................... 15 57636

(51) Int. Cl.
*C22B 34/00* (2006.01)
*C22B 34/24* (2006.01)
*C22B 3/26* (2006.01)
*C01G 35/00* (2006.01)
*C22B 3/42* (2006.01)
*C25C 1/06* (2006.01)

(52) U.S. Cl.
CPC ............ *C22B 34/24* (2013.01); *C01G 35/003* (2013.01); *C22B 3/0005* (2013.01); *C22B 3/42* (2013.01); *C25C 1/06* (2013.01); *Y02P 10/234* (2015.11)

(58) Field of Classification Search
CPC ......... C22B 34/24; C22B 3/42; C22B 3/0005; C01G 35/003; C25C 1/06; Y02P 10/234
USPC ........................................... 423/63; 205/371
See application file for complete search history.

(56) References Cited

U.S. PATENT DOCUMENTS

| 2,998,298 A | * | 8/1961 | Scheller | ................. | C01G 33/00 423/63 |
| 4,673,554 A | * | 6/1987 | Niwa | ................... | C01G 35/003 423/63 |
| 2004/0213716 A1 | | 10/2004 | Singh Gaur et al. | | |

FOREIGN PATENT DOCUMENTS

| EP | 185550 | * | 6/1986 |
| EP | 241278 | * | 10/1987 |
| WO | WO 2014/058312 | * | 4/2014 |

OTHER PUBLICATIONS

Tian G.C. et al. "Application of ionic liquids in hydrometallurgy of nonferrous metals" IN: Transactions of Nonferrous Metals Society of China, Mar. 1, 2010, vol. 20, n° 3, pp. 513-520.
Guor-Tzo Wei et al. "Room temperature ionic liquid as a novel medium for liquid/liquid extraction of metal ions" IN: Analytica Chimica Acta, Elsevier, Amsterdam, NL, Jul. 25, 2003, vol. 488, pp. 183-192.
International Search Report for International Application No. PCT/EP2016/068998 dated Oct. 17, 2016.
(Continued)

*Primary Examiner* — Steven J Bos
(74) *Attorney, Agent, or Firm* — Pearne & Gordon LLP

(57) ABSTRACT

A method for extracting the tantalum from an acid aqueous phase A1 comprising at least one step comprising the bringing of the aqueous phase A1 into contact with a phase A2 not miscible with water, and then the separation of the aqueous phase A1 from the phase A2, the phase A2 consisting of one ionic liquid or a mixture of ionic liquids as an extractant. A method for recovering the tantalum that implements this extraction method and to a use of an ionic liquid or of a mixture of ionic liquids as an extractant, in order to extract the tantalum from such an aqueous phase A1.

27 Claims, 8 Drawing Sheets

(56) References Cited

OTHER PUBLICATIONS

French Search Report for French Application FR 1557636 dated May 27, 2016.
Written Opinion issued in Patent Application No. PCT/EP2016/068998 dated Aug. 10, 2015.

* cited by examiner

PROCESS FOR EXTRACTING AND RECOVERING TANTALUM PRESENT IN AN ACID AQUEOUS PHASE BY MEANS OF AN IONIC LIQUID, AND USE OF SUCH AN IONIC LIQUID FOR EXTRACTING THE TANTALUM FROM AN ACID AQUEOUS PHASE

This is a National Stage application of PCT international application PCT/EP2016/068998, filed on Aug. 10, 2016 which claims the priority of French Patent Application No. 1557636, filed Aug. 10, 2015, both of which are incorporated herein by reference in their entirety.

TECHNICAL FIELD

The present invention relates to the field of extraction of tantalum from an acid aqueous phase in which this tantalum is present.

It relates more particularly to a method for extracting the tantalum from an acid aqueous phase, this extraction method comprising the bringing of this aqueous phase into contact with a phase that is not miscible with water.

The invention also relates to a method for recovering the tantalum present in an acid aqueous phase that implements the extraction method mentioned just above.

The present invention also relates to the use of a specific extractant, in order to extract the tantalum from an acid aqueous phase in which it is present.

The acid aqueous phase from which the tantalum can be extracted, or from which the tantalum can be recovered, can in particular be a solution deriving from an acid digestion of a concentrate of ores or of waste comprising said tantalum.

The present invention can in particular be used in the treatment of natural ores and/or of industrial waste, such as waste from electrical and electronic equipment, in order to reuse the tantalum present therein.

PRIOR ART

Tantalum, having the symbol Ta, is a transition metal that has a high melting point, a very high resistance to corrosion by acids, and good electrical conductivity and thermal conductivity properties. Tantalum is at present used in various fields and, in particular, in the chemical industry, aeronautics, the medical industry, electronics and, more particularly, to manufacture capacitors.

The main source of tantalum currently comes from ores, in particular the columbite-tantalite in which this chemical element is associated with niobium. The rest of the production of tantalum comes from the treatment of tin slag and from the recycling of industrial waste.

The methods currently used to recover the tantalum from these natural or industrial ores involve submitting these ores, previously ground, to chemical treatments in order to obtain a mineral concentrate, which is then subjected to a chemical digestion conventionally carried out by means of one or more inorganic acids. The solution thus obtained, called "acid digestion solution", is then subjected to a hydrometallurgical treatment based on the technique of liquid-liquid extraction, which involves bringing the aqueous phase consisting of this acid digestion solution into contact with an organic phase comprising one or more extractants, in order to obtain the extraction of this tantalum.

Numerous extractants have been developed in order to extract the tantalum from such an acid aqueous phase. For example, these include the phosphorus derivatives such as tri-n-butyl phosphate (or TBP) and trioctylphosphine oxide (or TOPO), the fatty amines, the sulfoxides, the fatty alcohols such as octan-2-ol, and the ketones such as cyclohexanone and methyl isobutyl ketone (or MIBK), these extractants being, if necessary, in solution in a solvent or organic diluent.

MIBK, TBP, cyclohexanone and octan-2-ol belong to the extractants that are used industrially to extract the tantalum from an acid aqueous phase, with MIBK being the extractant the most used at present.

Nevertheless, MIBK, which has a high volatility and a flash point of 14° C., is very flammable, which poses problems in terms of industrial safety and also environmental safety.

In order to meet perpetually increasing needs for tantalum, in particular by reusing industrial and domestic waste containing this metal, it would be desirable to have an extractant that, while having a remarkable ability to extract the tantalum from an acid aqueous phase, in general does not have the disadvantages that the extractants currently used have.

The inventors have therefore set the goal of proposing a method allowing the tantalum present in an acid aqueous phase to be extracted, with a yield and a selectivity, with respect to the other metals and impurities also present in this acid aqueous phase, that are remarkable, under optimised industrial safety and environmental safety conditions.

DISCLOSURE OF THE INVENTION

This goal mentioned above, as well as others, are reached first of all by a method for extracting the tantalum from an acid aqueous phase A1 of the type mentioned above, that is to say, by a method comprising at least one step comprising the bringing of the aqueous phase A1 into contact with a phase A2 not miscible with water, and then the separation of the aqueous phase A1 from the phase A2.

According to the invention, the phase A2 consists of one ionic liquid or a mixture of ionic liquids as an extractant.

As is clearly established by the scientific literature, an ionic liquid is a salt having a melting temperature of less than 100° C. and often even less than the ambient temperature. An ionic liquid typically consists of an organic cation and of an anion that can be organic or inorganic.

Since ionic liquids are characterised by a high thermal stability, an almost zero vapour pressure (which prevents any evaporation thereof into the atmosphere) and a very low flammability, they are used as substitutes to the conventional organic solvents that are routinely used in chemical reactions.

The inventors have observed, however, in an unexpected and surprising manner, that a phase A2 consisting of one ionic liquid or of a mixture of ionic liquids allows the tantalum present in an acid aqueous phase to be extracted with good performance and with selectivity. Thus, the ionic liquid or mixture of ionic liquids carries out not only the function of organic solvent or organic diluent, but also the function of extractant.

When it is indicated that this phase A2 can consist of one ionic liquid or of a mixture of ionic liquids, it is meant that this phase A2 does not comprise any other organic solvent or organic diluent, which allows the industrial safety and environmental safety conditions to be optimised and the management of the extraction method to be simplified, while limiting the number of compounds implemented.

In an advantageous alternative of the invention, the phase A2 consists of one ionic liquid, that is to say that this phase A2 consists of only one single ionic liquid.

But nothing prevents this phase A2 from being able to consist of a mixture of two, three or even more ionic liquids.

By definition, the ionic liquid or the ionic liquids forming the mixture comprise an organic cation and an anion. From the point of view of nomenclature, the cation is noted in brackets and indicated first.

In an advantageous alternative of the invention, the anion of the ionic liquid(s) is an organic anion, advantageously chosen from bis-(trifluoromethanesulfonyl)imide, symbolised by "$NTf_2$", hexafluorophosphate, noted as "$PF_6$", and bis-(fluorosulfonyl)imide, noted as "$N(SO_2F)_2$" or "FSI".

In a preferred alternative of the invention, the organic anion is bis-(trifluoromethanesulfonyl)imide $NTf_2$.

In an advantageous alternative of the invention, the organic cation of the ionic liquid(s) comprises a nitrogen group chosen from the group consisting of a quaternary ammonium, which may be cyclical or non-cyclical, a phosphonium, a piperidinium, a pyridinium, a pyrrolidinium, a piperazinium and an imidazolium, with these nitrogen group being symbolised, respectively, by "A", "P", "Pip", "Py", "Pyr", "Piperaz" et "IM".

The quaternary ammonium can in particular be a tetraalkylammonium.

In an even more advantageous alternative of the invention, the organic cation of the ionic liquid(s) comprises a nitrogen group chosen from the group consisting of a piperidinium, a pyridinium, a pyrrolidinium, a piperazinium and an imidazolium.

In a first more particularly advantageous version of the invention, this organic cation is chosen from the group consisting of a dialkylpiperidinium, an alkylpyridinium, an N,N'-dialkylpiperazinium and an N,N'-dialkylimidazolium. In the rest of the present application, an ionic liquid comprising such an organic cation comprising this or these alkyl group(s) is called "non-functionalised ionic liquid".

This or these alkyl group(s), advantageously $C_1$ to $C_{10}$ groups, can be linear or branched. They are symbolised by the first letter of the alkyl group(s) carried by the cation, to the left of the symbol of said cation.

Examples of non-functionalised ionic liquids, when the anion is bis-(trifluoromethanesulfonyl)imide $NTf_2$, include the following ionic liquids:

ethylbutylpiperidinium bis-(trifluoromethanesulfonyl) imide, symbolised by [EBPip]$NTf_2$, having the following formula:

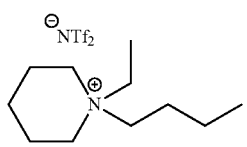

N-butyl-N-methylimidazolium bis-(trifluoromethanesulfonyl)imide, symbolised by [BMIM]$NTf_2$, having the formula:

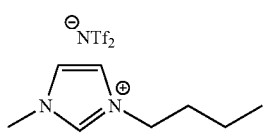

In a second more particularly advantageous version of the invention, this organic cation can further comprise at least one functional group chosen from a ketone, an alcohol, a phosphonate and a phosphine oxide. In the rest of the present application, an ionic liquid comprising such an organic cation comprising this or these functional group(s) is called "functionalised ionic liquid".

A functionalised ionic liquid can also comprise one or more groups such as an alkyl group, linear or branched, or an aromatic group, optionally substituted.

Ionic liquids comprising a ketone function, that is to say, ionic liquids in which the organic cation comprises a ketone function, can be synthesised via various pathways, such as the pathways A, B and C explained below.

Pathway A

According to pathway A, the synthesis of such ionic liquids can implement the following reaction (1):

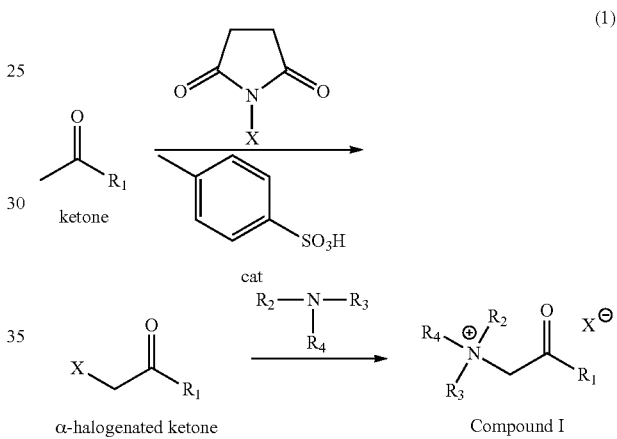

(1)

In order to obtain the ionic liquid implemented in the context of the present invention, the halide anion $X^-$ of Compound I is exchanged by the anion $NTf_2$ according to the following reaction (1'):

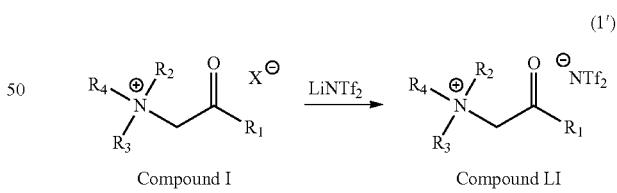

(1')

In the compounds in reactions (1) and (1') above, $R_1$ can in particular be an alkyl group, linear or branched, an aromatic group, optionally substituted. For example, $R_1$ can be an n-alkyl group, an isobutyl group, a tertio-butyl group, a phenyl group or a tolyl group.

Pathway B

The synthesis of ionic liquids according to the pathway B is illustrated by the synthesis of 1-ethyl-4-oxopentyl-piperidinium bis-(trifluoromethanesulfonyl)imide, [EPipP4K] $NTf_2$, from acetylbutyrolactone that implements the following successive reactions (2) and (2'):

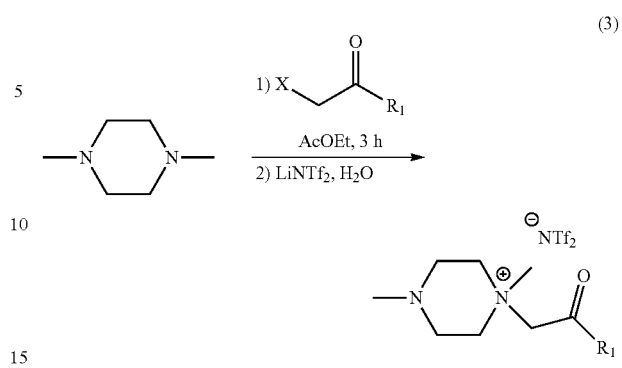

(2)

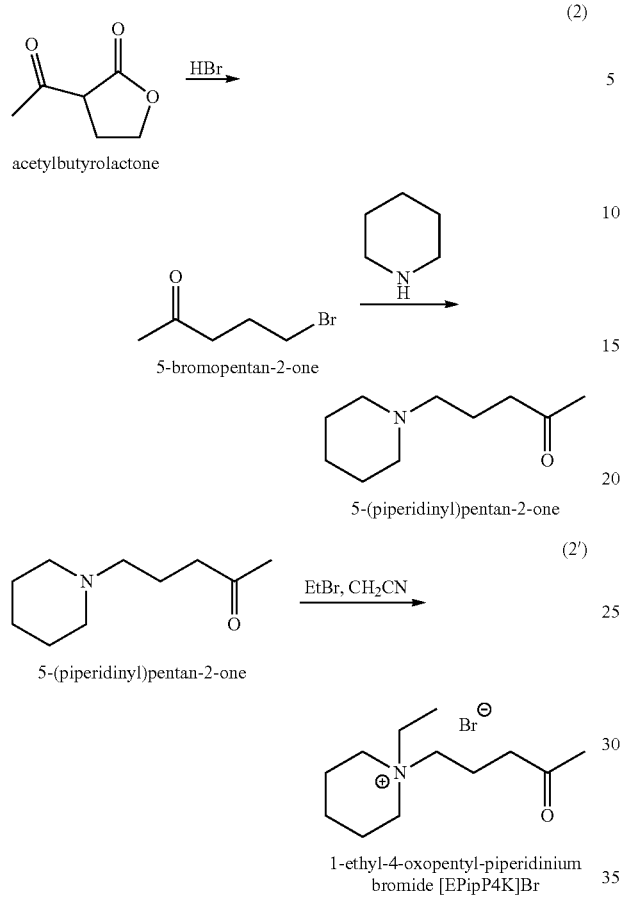

In order to obtain the ionic liquid implemented in the context of the present invention, the bromide anion Br exchanged by the anion NTf$_2$ according to the following reaction (2"):

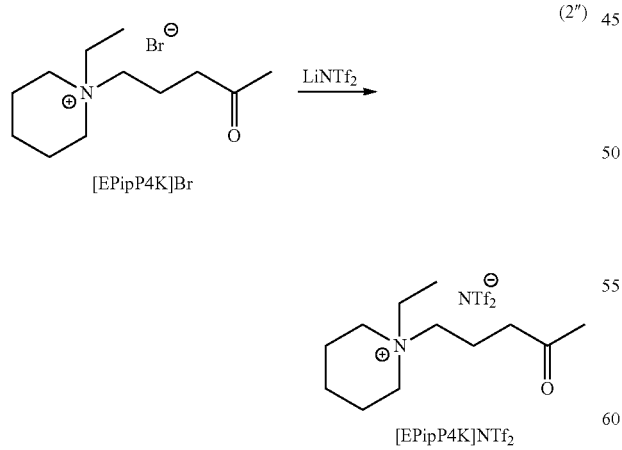

Pathway C

According to pathway C, an ionic liquid comprising a ketone function can be synthesised according to the following reaction (3):

(3)

Examples of functionalised ionic liquids comprising a ketone function and the anion NTf$_2^-$ include the following ionic liquids:

N-ethyl-N-(4-methyl-2-oxopentyl)-piperidinium bis-(trifluoromethanesulfonyl)imide, [EPipMIBK]NTf$_2$, having the formula

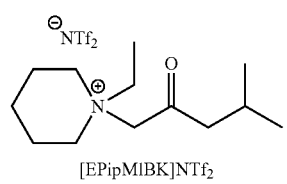

[EPipMIBK]NTf$_2$

N-ethyl-N-acetophenone piperidinium bis-(trifluoromethanesulfonyl)imide, [EPipAcP]NTf$_2$, having the formula

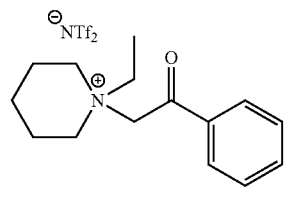

[EPipAcP]NTf$_2$

N-ethyl-N-4'-methylacetophenone piperidinium bis-(trifluoromethanesulfonyl)imide, [EPipMAcP]NTf$_2$, having the formula

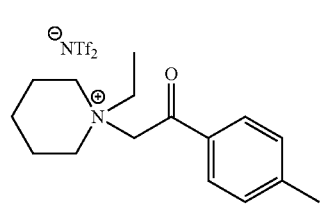

[EPipMAcP]NTf$_2$

N-methyl-N-(4-methyl-2-oxopentyl)imidazolium bis-(trifluoromethanesulfonyl)imide, [MIMMIBK]NTf$_2$, having the formula

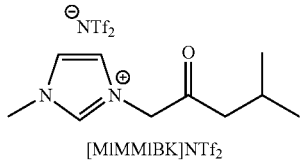

[MIMMIBK]NTf$_2$

N-(4-methyl-2-oxopentyl)pyridinium bis-(trifluoromethanesulfonyl)imide, [PyMIBK]NTf$_2$, having the formula

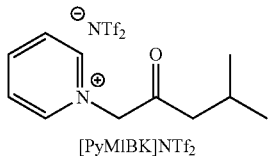

[PyMIBK]NTf$_2$

N-ethyl-N-pinacolone piperidinium bis-(trifluoromethanesulfonyl)imide, [EPipPin]NTf$_2$, having the formula

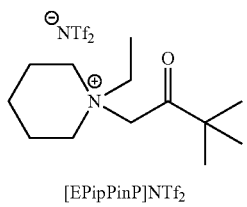

[EPipPinP]NTf$_2$

N-methyl-N-pinacolone-imidazolium bis-(trifluoromethanesulfonyl)imide, [MIMPin]NTf$_2$, having the formula

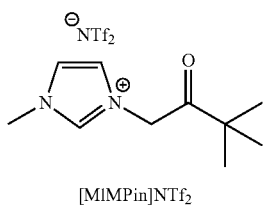

[MIMPin]NTf$_2$ 1-ethyl-4-oxopentyl-piperidinium bis-(trifluoromethanesulfonyl)imide, [EPipP4K]NTF$_2$, having the formula

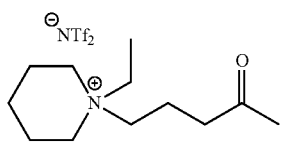

N,N-1,4-dimethyl-N-(4-methyl-2-oxopentyl)piperazinium bis-(trifluoromethanesulfonyl)imide, [MMPiperazMIBK]NTf$_2$, having the formula

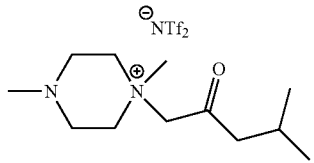

Ionic liquids comprising an alcohol function, that is to say, ionic liquids in which the organic cation comprises an alcohol function, can be synthesised according to the following reaction (4):

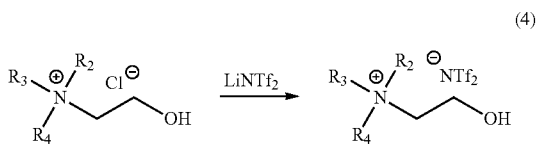

(4)

The following ionic liquid is an example of a functionalised ionic liquid comprising an alcohol function and the anion NTf$_2^-$:

choline bis-(trifluoromethanesulfonyl)imide, [Chol]NTf$_2$, having the formula

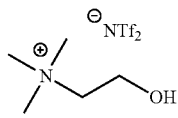

Ionic liquids comprising a phosphine oxide function, that is to say ionic liquids in which the organic cation comprises a phosphine oxide function, can be synthesised according to the following reaction (5):

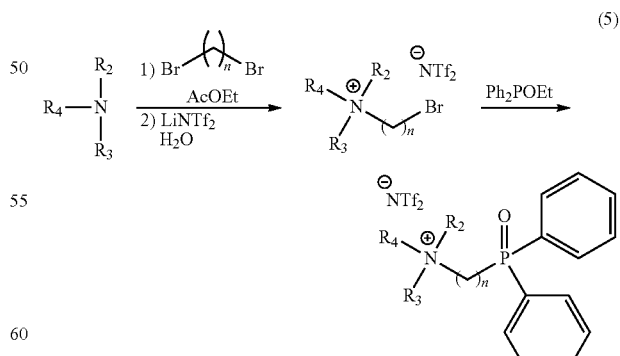

(5)

Ionic liquids comprising a phosphonate function, that is to say ionic liquids in which the organic cation comprises a phosphonate function, can be synthesised according to the following reaction (6):

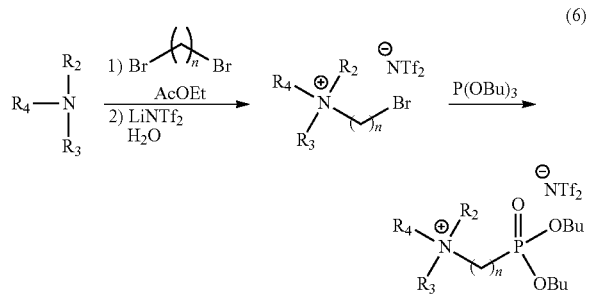 (6)

The following ionic liquid is an example of a functionalised ionic liquid comprising a phosphonate function and the anion $NTf_2^-$:

N-(4-(dibutoxyphosphoryl)butyl)-N-ethylpiperidinium bis-(trifluoromethanesulfonyl)imide, [EPipBPhos] $NTf_2$, having the formula

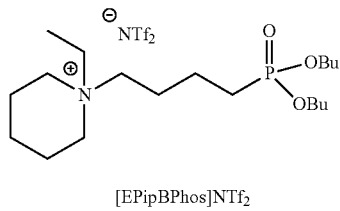

[EPipBPhos]$NTf_2$

As already specified in this second more particularly advantageous version of the invention, the organic cation can comprise at least one functional group chosen from a ketone, an alcohol, a phosphonate and a phosphine oxide. Thus, this organic cation can comprise only a single functional group, which is the case of all of the ionic liquids described above.

It should be noted that among the functional groups mentioned, the phosphonate functional group is more particularly preferred.

However, nothing prevents this organic cation and, consequently, the corresponding functionalised ionic liquid, from comprising two or even more functional groups.

Among the ionic liquids possible for the implementation of the extraction method according to the invention, the following ionic liquids are more particularly preferred, given their performance, both in terms of yields of extraction of the tantalum and then of stripping, but also in terms of selectivity with respect to the other metals present in the acid aqueous phase from which this tantalum is extracted:

N-ethyl-N-(4-methyl-2-oxopentyl)piperidinium bis-(trifluoromethanesulfonyl)imide,
N-methyl-N-(4-methyl-2-oxopentyl)imidazolium bis-(trifluoromethanesulfonyl)imide,
N-(4-methyl-2-oxopentyl)pyridinium bis-(trifluoromethanesulfonyl)imide,
(4-(dibutoxyphosphoryl)-butyl)ethylpiperidinium bis-(trifluoromethanesulfonyl)imide,
ethylbutylpiperidinium bis-(trifluoromethanesulfonyl)imide, and
methylimidazolium bis-(trifluoromethanesulfonyl)imide.

Moreover, and advantageously, the extraction method according to the invention can be implemented at a temperature not exceeding 80° C. and, advantageously, between 18° C. and 40° C. Thus, in addition to the advantages already mentioned for the extraction method according to the invention, there is that of limiting the energy costs related to its implementation.

According to an advantageous alternative of the extraction method according to the invention, the aqueous phase A1 is an acid digestion solution, typically by one or more inorganic acids, of a concentrate of a natural ore, or of an urban ore, comprising said tantalum. "Urban ore" means that the source of tantalum can in particular come from the recycling of industrial and domestic waste such as waste from electrical and electronic equipment, also called "WEEE" or "W3E".

According to another advantageous alternative of the invention, the aqueous phase A1 comprises at least one inorganic acid chosen from the group consisting of hydrofluoric acid, sulphuric acid, nitric acid, phosphoric acid and hydrochloric acid.

According to a preferred alternative, the aqueous phase A1 comprises at least sulphuric acid.

According to another advantageous alternative of the invention, this aqueous phase A1 has a total molar concentration of inorganic acid(s) of at least 0.1 mol/L, advantageously ranging from 1 mol/L to 14 mol/L and, preferably, from 3 mol/L to 9 mol/L.

The present invention relates secondly to a method for recovering the tantalum present in an acid aqueous phase A1.

According to the invention, this recovery method comprises the following steps:
(a) the extraction of the tantalum from the aqueous phase A1 by an extraction method as defined above; and
(b) the stripping of said tantalum present in the phase A2 as obtained after step (a), or
(b') the electrodeposition of said tantalum present in the phase A2 as obtained after step (a).

In other words, the recovery method according to the invention comprises the following steps:
(a) the extraction of the tantalum from the aqueous phase A1 by bringing the aqueous phase A1 into contact with a phase A2 not miscible with water and consisting of one ionic liquid or a mixture of ionic liquids as an extractant, then the separation of the aqueous phase A1 from the phase A2, and
(b) the stripping of said tantalum present in the phase A2 as obtained after step (a), or
(b') the electrodeposition of said tantalum present in the phase A2 as obtained after step (a).

In this recovery method according to the invention, the extraction step (a) is carried out by means of the extraction method as defined above, with the possibility of the advantageous features of this extraction method, such as those relating to the compositions of the phase A2 and acid aqueous phase A1, being taken alone or in combination.

The inventors have also brought to light the fact that both the step (b) of stripping of the tantalum and the step (b') of electrodeposition of the tantalum have particularly good performance and allow the tantalum previously extracted from the aqueous phase A1 to be recovered quantitatively.

In an advantageous alternative of the recovery method according to the invention, the step (b) of stripping comprises the bringing of this phase A2 into contact with an aqueous phase A3 having a pH that is less than or equal to 7, and then the separation of the phase A2 from the aqueous phase A3.

The aqueous phase A3 can comprise, in addition to water, an organic or inorganic acid, for example in molar concentrations from 0.001M to 0.1M.

In an advantageous alternative of the recovery method according to the invention, the aqueous phase A3 has a pH ranging from 1 to 7, preferably a pH of 7.

The organic acid can, for example, be ethylenediaminetetraacetic acid (EDTA). The inorganic acid can, for example, be sulphuric acid. The aqueous phase A3 can also consist of a solution of ammonium oxalate.

In a preferred alternative of the recovery method according to the invention, the aqueous phase A3 only consists of water, which can be distilled water, ion-exchanged water or deionised water.

In advantageous alternative of the recovery method according to the invention, the step (b') of electrodeposition involves applying a difference in potential between a cathode and a reference electrode, in the presence of a working electrode, all of these electrodes being placed in the phase A2 as obtained after step (a), this phase A2 thus forming an electrolytic solution. The deposition of tantalum in its metal form at the cathode is thus observed, this deposition resulting from the reduction of the tantalum present in this electrolytic solution or phase A2.

The reference electrode can be of the Ag(I)/Ag(0) type, thus consisting of a silver wire submerged in a solution containing a salt of Ag(I), while the working electrode can be formed by a substrate made of aluminium, titanium, carbon, nickel, copper, iron, stainless steel or zinc and, advantageously, made of aluminium, titanium or carbon.

In an advantageous alternative of the recovery method according to the invention, the difference in potential applied between the cathode and the Ag(I)/Ag(0) reference electrode is between −0.8V and −2.4V, advantageously between −1.4V and −2.1V and, preferably, between −1.4V and −1.6V.

The temperature of the electrolytic solution or phase A2 is advantageously between 60° C. and 120° C.

The phase A2, as obtained after the step (b) of stripping or after the step (b') of electrodeposition, can thus advantageously be recycled in order to be once again implemented in the context of a step (a) of extraction, as a phase A2 not miscible with water.

The present invention relates, thirdly, to a use of a specific extractant in order to extract the tantalum from an acid aqueous phase A1.

According to the invention, this specific extractant, the use of which forms the object of the present invention, is one ionic liquid or a mixture of ionic liquids, said ionic liquid(s) comprising an organic cation and an anion, said organic cation comprising a nitrogen group as defined above and chosen from the group consisting of a piperidinium, a pyridinium, a pyrrolidinium, a piperazinium and an imidazolium.

In an advantageous alternative of the invention, the anion of the ionic liquid(s) is an organic anion, advantageously chosen from bis-(trifluoromethanesulfonyl)imide, hexafluorophosphate and bis(fluorosulfonyl)imide.

In a preferred alternative of the invention, the organic anion is bis-(trifluoromethanesulfonyl)imide.

In a first version of the use according to the invention, this ionic liquid is a non-functionalised ionic liquid, that is to say, an ionic liquid, the organic cation of which is chosen from the group consisting of a dialkylpiperidinium, an alkylpyridinium, an N,N'-dialkylpiperazinium and an N,N'-dialkylimidazolium. Reference is made here to that which was described above for advantageous alternatives and examples of non-functionalised ionic liquids suitable for being used in the context of the present invention.

In a second version of the use according to the invention, this ionic liquid is a functionalised ionic liquid, that is to say, an ionic liquid, the organic cation of which further comprises at least one functional group chosen from a ketone, an alcohol, a phosphonate and a phosphine oxide. Reference is made here to that which was described above for advantageous alternatives and examples of functionalised ionic liquids suitable for being used in the context of the present invention According to an advantageous alternative of the invention, the extraction is carried out by means of the technique of liquid-liquid extraction, a technique that involves bringing the acid aqueous phase A1 comprising the tantalum into contact with a phase that comprises this ionic liquid or the mixture of such ionic liquids, this phase optionally being able to further comprise other compounds such as one or more organic solvents or organic diluents.

According to a preferred alternative of the invention, the extraction is carried out by bringing the acid aqueous phase A1 comprising the tantalum into contact with a phase A2 that consists of only one ionic liquid alone or of the mixture of such ionic liquids, in the absence of any other organic solvent or organic diluent.

In the context of the present invention, "mixture of ionic liquids" means the mixture of two, three or even more ionic liquids that can be functionalised and/or non-functionalised.

Other features and advantages of the invention will be clear upon reading the examples that follow and that relate to the synthesis of ionic liquids and to trials that demonstrate the ability of these ionic liquids to extract the tantalum from acid aqueous solutions in which this tantalum is present.

It is specified that these examples, which are in particular described in relation to the appended FIGS. 1 to 15B, are only given as illustrations of the objects of the invention and in no way form a limitation of these objects.

EXAMPLES

Synthesis of Ionic Liquids

Figure 1:
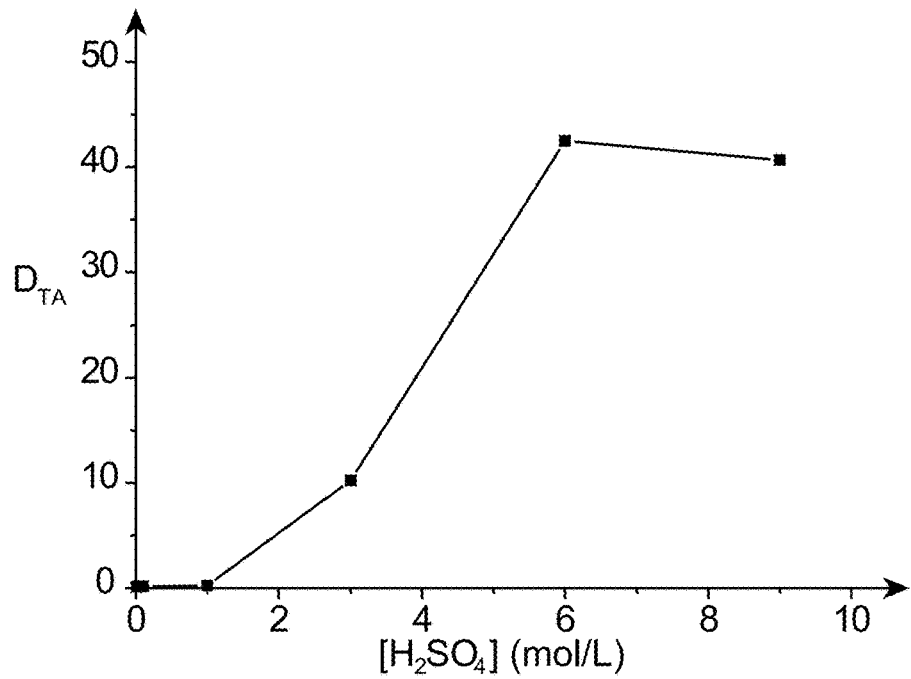
FIG. 1 illustrates the effect of the molar concentration of sulphuric acid of an aqueous phase A1 comprising Ta on the coefficient of distribution of this Ta (noted as $D_{Ta}$) when this Ta is extracted from said aqueous phase A1 by means of a phase A2 consisting of [EPipMIBK]NTf$_2$.

Example 1: Synthesis of Ionic Liquids Comprising a Ketone Function

As indicated above, the synthesis of ionic liquids comprising a ketone function can be carried out according to the pathway A or the pathway B. Regardless of the pathway A or B used, this synthesis requires those of intermediate compounds, noted hereinafter as "Compounds I", comprising a halide anion.

1.1 Synthesis of the Intermediate Compounds 1.1.1 According to the Pathway A

The reactions used are the following:

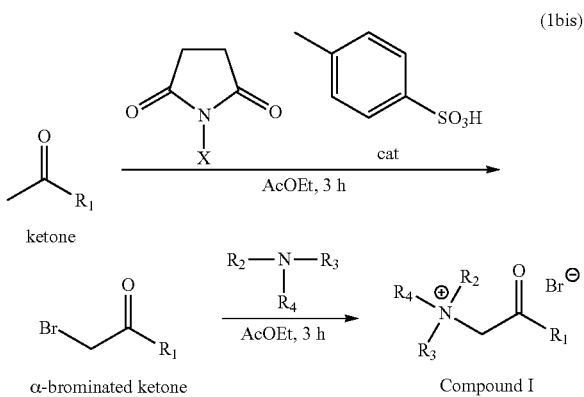

(1bis)

A.1 Synthesis of α-Brominated Ketones

The operating protocol followed for the synthesis of α-brominated ketones is the following: 100 mmol of N-bromosuccinimide are added all at once to a solution of 100 mmol of ketone $CH_3C(O)R_1$ and of 10 mmol of p-toluenesulfonic acid in 100 mL of ethyl acetate. The mixture is stirred for 4 h at ambient temperature and away from light. The mixture is then filtered, the organic phase washed with a 1M solution of potassium carbonate, of saturated sodium thiosulfate and with distilled water (2 times). The organic phase is then dried over sodium sulphate and concentrated under vacuum. The α-brominated ketone obtained is in the form of a yellow oil.

The α-brominated ketones C1 to C3, which were synthesised in accordance with the operating protocol described just above, are specified in Table 1 below.

TABLE 1

| α-brominated ketone | $R_1$ | α-brominated ketone obtained | Yield (%) |
|---|---|---|---|
| C1 | $(CH_3)_2CHCH_2$— | 1-bromo-4-methyl-pentan-2-one (*) | 61 |
| C2 | $C_6H_5$— | 2-bromo-acetophenone | 95 |
| C3 | p-$CH_3$—$C_6H_4$— | 2-bromo-4'-methyl-acetophenone | 95 |

The asterisk noted as (*) in Table 1 specifies that the 1-bromo-4-methyl-pentan-2-one (ketone C1) is obtained in a mixture with 3-bromo-4-methyl-pentan-2-one, with a ratio of 65/35.

The characterisation data for these α-brominated ketones C1 to C3 are the following:

Ketone C1: 1-bromo-4-methyl-pentan-2-one $^1$H NMR (400 MHz, CDCl$_3$) δ (ppm): 0.92 (d, 6H, J=6.7 Hz, CH$_3$); 2.18 (m, 1H, CH); 2.51 (d, 2H, J=7.0 Hz, C(O)—CH$_2$); 3.86 (s, 2H, Br—CH$_2$—C(O))

Ketone C2: 2-bromo-acetophenone $^1$H NMR (400 MHz, CDCl$_3$) δ (ppm): 4.56 (s, 2H, Br—CH$_2$—C(O)); 7.49 (t, 2H, J=7.5 Hz, CH$_{Ar}$); 7.61 (t, 2H, J=7.5 Hz, CH$_{Ar}$); 7.98 (d, 2H, J=7.5 Hz, CH$_{Ar}$).

Ketone C3: 2-bromo-4'-methylacetophenone $^1$H NMR (400 MHz, CDCl$_3$) δ (ppm): 2.42 (s, 3H, CH$_3$); 4.43 (s, 2H, Br—CH$_2$—C(O)); 7.29 (d, 2H, J=8.0 Hz, CH$_{Ar}$); 7.88 (d, 2H, J=8.0 Hz, CH$_{Ar}$).

A.2 Synthesis of Compounds I

The operating protocol followed for the synthesis of Compounds I is described in reference to the synthesis of N-ethyl-N-(4-methyl-2-oxopentyl)piperidinium bromide, noted as [EPipMIBK]Br, from the mixture of 1-bromo-4-methyl-pentan-2-one (α-brominated ketone C1) and 3-bromo-4-methyl-pentan-2-one synthesised in chapter A.1 above.

17 mL (126 mmol) of ethylpiperidine are added drop by drop to a solution of 1-bromo-4-methyl-pentan-2-one and of 3-bromo-4-methyl-pentan-2-one in a ratio of 65/35 (31.45 g of mixture or 18.87 g corresponding to 105 mmol of α-brominated ketone C1) in 100 mL of ethyl acetate. The mixture is stirred at ambient temperature for 12 h. The heterogeneous mixture is then filtered, the salts are washed 2 times with ethyl acetate and then the solvent is evaporated at a reduced pressure. The compound [EPipMIBK]Br obtained, noted as I1, is in the form of a white solid (23.0 g, i.e. a yield of 75%).

The Compounds I1 to I5 (synthesised in accordance with the operating protocol described just above), as well as the Compounds I6 and I7 (the synthesis of which is detailed below), are specified in Table 2 below.

TABLE 2

| Compounds I | α-halogenated ketone | Nitrogen compound | Abbreviation of the Compound 1 | Yield (%) |
|---|---|---|---|---|
| I1 | C1 | ethylpiperidine | [EPipMIBK]Br | 75 |
| I2 | C2 | ethylpiperidine | [EPipAcP]Br | 95 |
| I3 | C3 | ethylpiperidine | [EPipAcMP]Br | 88 |
| I4 | C1 | methylimidazole | [MIMMIBK]Br | 80 |
| I5 | C1 | pyridine | [PyMIBK]Br | 80 |
| I6 | 1-iodopinacolone | ethylpiperidine | [EPipPin]I | 80 |
| I7 | 1-chloropinacolone | methylimidazole | [MIMPin]Cl | 80 |

The semi-structural formulas and characterisation data of these Compounds I1 to I7 are the following:

Compound I1: N-ethyl-N-(4-methyl-2-oxopentyl)piperidinium bromide, [EPipMIBK]Br, Having the Formula

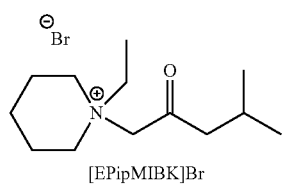

[EPipMIBK]Br $^1$H NMR (400 MHz, CDCl$_3$) δ (ppm): 0.76 (d, 3H, J=6.5 Hz, CH$_3$); 1.18 (t, 3H, J=7.5 Hz, CH$_3$—CH$_2$—N); 1.61-1.86 (m, 6H, CH$_2$); 2.01 (m, 1H, CH); 2.39 (d, 2H, J=7.0 Hz, C(O)—CH$_2$); 3.54 (m, 2H, CH$_2$—N); 3.71 (q, 2H, J=7.5 Hz, CH$_3$—CH$_2$—N); 3.88 (m, 2H, CH$_2$—N); 4.86 (s, 2H, N—CH$_2$—C(O)).

$^{13}$C NMR (100 MHz, CDCl$_3$) δ (ppm): 8.2 (CH$_3$); 19.7; 20.6 (CH$_2$); 22.3 (CH$_3$); 24.0 (CH); 49.9 (C(O)—CH$_2$); 53.8 (CH$_3$—CH$_2$—N); 59.2 (CH$_2$—N); 63.1 (N—CH$_2$—C(O)); 202.3 (C(O)).

Compound I2: N-ethyl-N-acetophenone piperidinium bromide, [EPipAcP]Br, Having the Formula

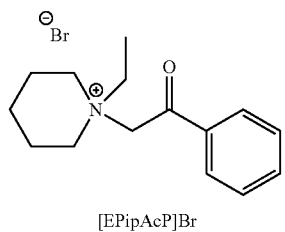 [SMILES: [Br-] ; CC[N+]1(CC(=O)c2ccccc2)CCCCC1]

[EPipAcP]Br $^1$H NMR (400 MHz, CDCl$_3$) δ (ppm): 1.31 (t, 3H, J=7.5 Hz, CH$_3$—CH$_2$—N); 1.79 (m, 2H, CH$_2$); 1.91 (m, 4H, CH$_2$); 3.83 (dt, 2H, J=12.5 Hz, J=4.5 Hz, m, CH$_2$—CH$_2$—N); 3.94 (m, 2H, J=7.5 Hz, CH$_3$—CH$_2$—N); 4.38 (m, 2H, CH$_2$—N); 5.62 (s, 2H, N—CH$_2$—C(O)); 7.44 (t, 2H, J=7.5 Hz, CH$_{Ar}$); 7.57 (t, 1H, J=7.5 Hz, CH$_{Ar}$); 8.19 (d, 2H, J=7.5 Hz, CH$_{Ar}$).

$^{13}$C NMR (100 MHz, CDCl$_3$) δ (ppm): 8.4 (CH$_3$); 20.1; 20.7 (CH$_2$); 53.2 (CH$_3$—CH$_2$—N); 59.7 (CH$_2$—N); 61.6 (N—CH$_2$—C(O)); 128.8; 129.1 (CH$_{Ar}$); 134.1 (C$_{Ar}$); 135.0 (CH$_{Ar}$); 191.5 (C(O)).

Compound I3: N-ethyl-N-4'-methylacetophenone piperidinium bromide, [EPipMAcP]Br, Having the Formula

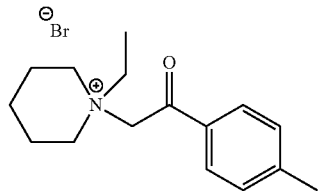

[EPipMAcP]Br $^1$H NMR (400 MHz, CDCl$_3$) δ (ppm): 1.30 (t, 3H, J=7.5 Hz, CH$_3$—CH$_2$—N); 1.79-1.91 (m, 6H, CH$_2$); 2.34 (s, 3H, CH$_3$—Ar); 3.81 (dt, 2H, J=12.5 Hz, J=4.5 Hz, m, CH$_2$—CH$_2$—N); 3.93 (m, 2H, J=7.5 Hz, CH$_3$—CH$_2$—N); 4.38 (m, 2H, CH$_2$—N); 5.55 (s, 2H, N—CH$_2$—C(O)); 7.23 (d, 2H, J=8.0 Hz, CH$_{Ar}$); 8.07 (d, 2H, J=8.0 Hz, CH$_{Ar}$).

$^{13}$C NMR (100 MHz, CDCl$_3$) δ (ppm): 8.4 (CH$_3$); 20.1; 20.7 (CH$_2$); 21.8 (CH$_3$—Ar); 53.2 (CH$_3$—CH$_2$—N); 59.7 (CH$_2$—N); 61.4 (N—CH$_2$—C(O)); 128.9; 129.8 (CH$_{Ar}$); 131.6 (C$_{Ar}$); 146.2 (CH$_{Ar}$); 190.9 (C(O)).

Compound I4: N-methyl-N-(4-methyl-2-oxopentyl)imidazolium bromide, [MIMMIBK]Br, Having the Formula

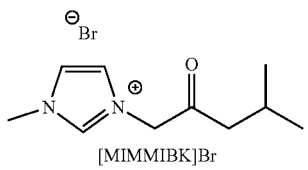

[MIMMIBK]Br $^1$H NMR (400 MHz, CDCl$_3$) δ (ppm): 0.91 (d, 3H, J=6.5 Hz, CH$_3$); 2.15 (m, 1H, CH); 2.53 (d, 2H, J=7.0 Hz, C(O)—CH$_2$); 4.02 (s, 3H, CH$_3$—N); 5.67 (s, 2H, N—CH$_2$—C(O)); 7.47 (q, 1H, J=2.0 Hz, CH$_{Ar}$); 7.61 (q, 1H, J=2.0 Hz, CH$_{Ar}$); 9.78 (S, 1H, J=2.0 Hz, CH$_{Ar}$).

$^{13}$C NMR (100 MHz, CDCl$_3$) δ (ppm): 22.6 (CH$_3$); 24.2 (CH); 36.9 (CH$_3$—Ar); 48.9 (C(O)—CH$_2$); 60.0 (N—CH$_2$—C(O)); 122.7 (CH$_{Ar}$); 124.1 (CH$_{Ar}$); 137.9 (CH$_{Ar}$); 201.7 (C(O)).

Compound I5: N-(4-methyl-2-oxopentyl)pyridinium bromide, [PyMIBK]Br, Having the Formula

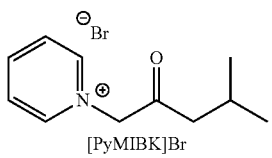

[PyMIBK]Br $^1$H NMR (400 MHz, CDCl$_3$) δ (ppm): 0.91 (d, 3H, J=6.5 Hz, CH$_3$); 2.19 (m, 1H, CH); 2.57 (d, 2H, J=7.0 Hz, C(O)—CH$_2$); 6.51 (s, 2H, N—CH$_2$—C(O)); 8.04 (t, 2H, J=7.0 Hz, CH$_{Ar}$); 8.49 (q, 1H, J=7.0 Hz, CH$_{Ar}$); 9.31 (d, 2H, J=6.0 Hz, CH$_{Ar}$).

$^{13}$C NMR (100 MHz, CDCl$_3$) δ (ppm): 22.7 (CH$_3$); 24.1 (CH); 49.0 (C(O)—CH$_2$); 66.6 (N—CH$_2$—C(O)); 127.6 (CH$_{Ar}$); 145.5 (CH$_{Ar}$); 146.3 (CH$_{Ar}$); 200.3 (C(O)).

Compound I6: N-ethyl-N-pinacolone piperidinium iodide, [EPipPin]I, Having the Formula

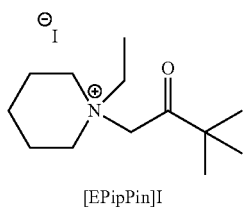

[EPipPin]I

The operating protocol implemented in order to synthesise the Compound I6 is the following: 24 mmol of ethylpiperidine are added to a solution of 20 mmol of 1-iodopinacolone in 20 mL of ethyl acetate and the mixture is stirred at 50° C. for 12 h. The heterogeneous mixture obtained is then filtered, the salts are washed 2 times with ethyl acetate and then the solvent is evaporated at a reduced pressure. The compound [EPipPin]I, which is obtained with a yield of 80%, is in the form of a very hygroscopic white solid.

The characterisation data of this compound are the following:

$^1$H NMR (400 MHz, CDCl$_3$) δ (ppm): 1.26 (s, 9H, CH$_3$); 1.31 (t, 3H, J=7.5 Hz, CH$_3$—CH$_2$—N); 1.74-1.98 (m, 6H, CH$_2$); 3.73-3.84 (m, 4H, CH$_2$—N; CH$_3$—CH$_2$—N); 4.20 (m, 2H, CH$_2$—N); 5.07 (s, 2H, N—CH$_2$—C(O)).

$^{13}$C NMR (100 MHz, CDCl$_3$) δ (ppm): 8.6 (CH$_3$—CH$_2$—N); 20.0; 20.5 (CH$_2$); 26.6 (CH$_3$); 45.0 (C(O)—C(CH$_3$)$_3$); 52.5 (CH$_3$—CH$_2$—N); 59.6 (CH$_2$—N; N—CH$_2$—C(O)); 208.1 (C(O)).

Compound I7: N-pinacolone methylimidazolium chloride, [MIMPin]Cl, Having the Formula

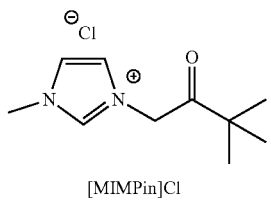

[MIMPin]Cl

The operating protocol implemented in order to synthesise the Compound I7 is the following: 24 mmol of methylimidazole are added to a solution of 20 mmol of 1-chloropinacolone in 20 mL ethyl acetate and the mixture is stirred at ambient temperature for 12 h. The heterogeneous mixture obtained is then filtered, the salts are washed 2 times with ethyl acetate and then the solvent is evaporated at a reduced pressure. The compound [MIMPin]Cl, which is obtained with a yield of 80%, is in the form of a very hygroscopic white solid.

The characterisation data of this compound are the following:

$^1$H NMR (400 MHz, CDCl$_3$) δ (ppm): 1.20 (s, 9H, CH$_3$); 3.96 (s, 3H, CH$_3$—Ar); 5.84 (s, 2H, N—CH$_2$—C(O)); 7.49 (s, 1H, CH$_{Ar}$); 7.62 (s, 1H, CH$_{Ar}$); 10.07 (s, 1H, CH$_{Ar}$).

$^{13}$C NMR (100 MHz, CDCl$_3$) δ (ppm): 26.2 (CH$_3$); 36.6 (CH$_3$—N); 43.4 ((CH$_3$)$_3$—C—C(O)); 54.3 (C(O)—CH$_2$); 122.5 (CH$_{Ar}$); 124.2 (CH$_{Ar}$); 138.4 (CH$_{Ar}$); 206.8 (C(O)).

1.1.2 According to the Pathway B

The reactions implemented are the following:

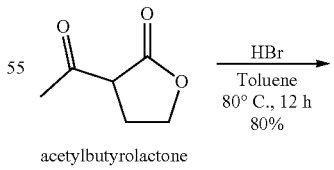

acetylbutyrolactone

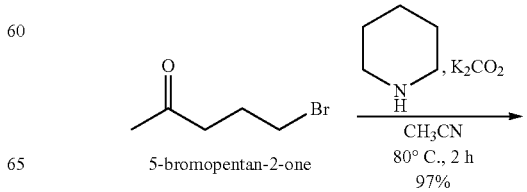

5-bromopentan-2-one

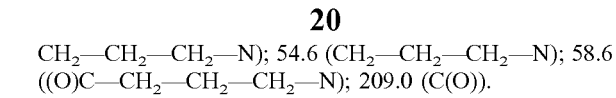

5-(piperidinyl)pentan-2-one

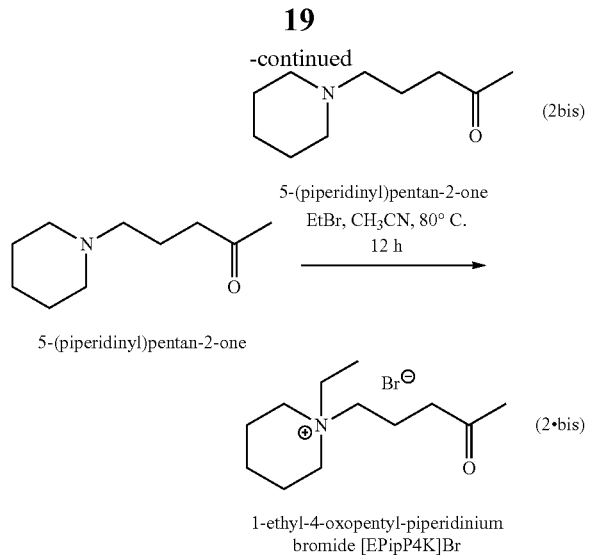

1-ethyl-4-oxopentyl-piperidinium bromide [EPipP4K]Br

B.1 Synthesis of the 5-bromopentan-2-one 13.5 mL (117 mmol) of hydrobromic acid at 48% are added to a solution of 10 g (78 mmol) of acetylbutyrolactone in the toluene. The mixture is heated to 80° C. overnight. After cooling, the biphasic mixture is separated. The aqueous phase is extracted two times with diethyl ether. The organic phases are then brought together, washed two times with water, dried over magnesium sulphate and concentrated. After distillation at a reduced pressure (100° C. at 20 mmbar), the 5-bromopentan-2-one (12.7 g, i.e. a yield of 80%) that is in the form of a colourless oil is obtained.

The characterisation data of this compound are the following:

$^1$H NMR (400 MHz, CDCl$_3$) δ (ppm): 2.11 (m, 2H, (O)C—CH$_2$—CH$_2$—CH$_2$—Br); 2.16 (s, 3H, CH$_3$—(O)C); 2.63 (t, J=7.0 Hz, 2H, (O)C—CH$_2$—CH$_2$—CH$_2$—Br); 3.44 (t, J=6.5 Hz, 2H, (O)C—CH$_2$—CH$_2$—CH$_2$—Br).

B.2 Synthesis of 5-(piperidinyl)pentan-2-one 6.0 g (43 mmol) of potassium carbonate and then a solution formed by 3.56 g (21.6 mmol) of 5-bromopentan-2-one synthesised in paragraph B.1 in 10 mL of dry acetonitrile are added successively and under an inert atmosphere to a solution of 2.4 mL (23.7 mmol) of piperidine in 30 mL of dry acetonitrile. The mixture is then heated to 80° C. for 2 h. After cooling, the mixture is filtered, the salts are washed with acetonitrile. The mixture is then concentrated under vacuum. The 5-(piperidinyl)pentan-2-one (3.53 g, i.e. a yield of 97%) thus obtained is in the form of a slightly yellow oil.

The characterisation data of this compound are the following:

$^1$H NMR (400 MHz, CDCl$_3$) δ (ppm): 1.39 (m, 2H, CH$_2$—CH$_2$—CH$_2$—N); 1.53 (m, 4H, CH$_2$—CH$_2$—CH$_2$—N); 1.74 (m, 2H, (O)C—CH$_2$—CH$_2$—CH$_2$—N); 2.13 (s, 3H, CH$_3$—(O)C); 2.24 (t, J=7.5 Hz, 2H, (O)C—CH$_2$—CH$_2$—CH$_2$—N); 2.32 (bs, 4H, CH$_2$—CH$_2$—CH$_2$—N); 2.41 (t, J=7.0 Hz, 2H, (O)C—CH$_2$—CH$_2$—CH$_2$—N).

$^{13}$C NMR (100 MHz, CDCl$_3$) δ (ppm): 21.3 ((O)C—CH$_2$—CH$_2$—CH$_2$—N); 24.5 (CH$_2$—CH$_2$—CH$_2$—N); 26.0 (CH$_2$—CH$_2$—CH$_2$—N); 30.1 (C(O)—CH$_3$); 41.8 ((O)C—CH$_2$—CH$_2$—CH$_2$—N); 54.6 (CH$_2$—CH$_2$—CH$_2$—N); 58.6 ((O)C—CH$_2$—CH$_2$—CH$_2$—N); 209.0 (C(O)).

B.3 Synthesis of 1-ethyl-4-oxopentyl-piperidinium bromide [EPipP4K]Br 3.3 mL (40 mmol) of bromoethane are added under an inert atmosphere to a solution of 3.53 g (20.1 mmol) of 5-(piperidinyl)pentan-2-one synthesised in paragraph B.2 in 10 mL of acetonitrile. The mixture is then heated to 80° C. for 12 h. After cooling, the mixture is concentrated under vacuum. The resulting solid is dissolved in a minimum of dichloromethane and re-precipitated by the addition of ethyl acetate. The solid is then washed two times with ethyl acetate and then dried under vacuum. The compound [EPipP4K]Br, noted as 18, thus obtained is in the form of a slightly yellow solid (5.28 g, i.e. a yield of 95%).

The characterisation data of this compound are the following:

$^1$H NMR (400 MHz, CDCl$_3$) δ (ppm): 1.35 (t, J=7.5 Hz, CH$_3$—CH$_2$—N); 1.74 (m, 2H, CH$_2$—CH$_2$—CH$_2$—N); 1.79-1.97 (m, 6H, CH$_2$—CH$_2$—CH$_2$—N; (O)C—CH$_2$—CH$_2$—CH$_2$—N); 2.12 (s, 3H, CH$_3$—(O)C); 2.72 (t, J=6.0 Hz, 2H, (O)C—CH$_2$—CH$_2$—CH$_2$—N); 3.47-3.63 (m, 8H, CH$_2$—CH$_2$—CH$_2$—N; (O)C—CH$_2$—CH$_2$—CH$_2$—N; CH$_3$—CH$_2$—N).

$^{13}$C NMR (100 MHz, CDCl$_3$) δ (ppm): 7.5 (CH$_3$—CH$_2$—N); 16.0; 19.8 (CH$_2$—CH$_2$—CH$_2$—N; (O)C—CH$_2$—CH$_2$—CH$_2$—N); 20.8 (CH$_2$—CH$_2$—CH$_2$—N); 30.1 (C(O)—CH$_3$); 39.1 ((O)C—CH$_2$—CH$_2$—CH$_2$—N); 54.2; 56.3 (CH$_2$—CH$_2$—CH$_2$—N); 58.7 (CH$_3$—CH$_2$—N); 207.3 (C(O)).

1.2 Synthesis of Ionic Liquids (Compounds LI)

The ionic liquids comprising a ketone function used in the context of the present invention are obtained from the intermediate compounds as synthesised in chapter 1.1 above, by means of exchange of the halide anion (Br$^-$, I$^-$ or Cl$^-$) by the anion bis-(trifluoromethanesulfonyl)imide, NTf$_2^-$.

The corresponding reaction is dependent on the pathway A or B implemented in order to obtain the Compounds I.

1.2.1 Compounds I1 to I7 Obtained According to the Pathway A

The exchange of the halide anion by the anion NTf$_2^-$ is carried out according to the following reaction (1'bis):

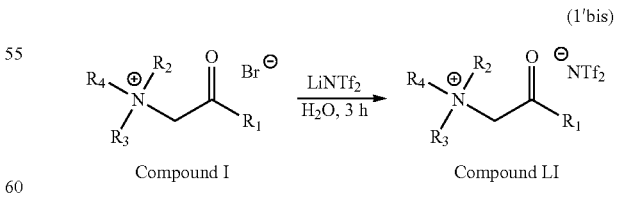

The operating protocol followed for the synthesis of the Compounds LI is described in reference to the synthesis of N-ethyl-N-(4-methyl-2-oxopentyl)piperidinium bis-(trifluoromethanesulfonyl)imide, [EPipMIBK]NTf$_2$, noted as LI1, from the [EPipMIBK]Br (Compound I1) synthesised in chapter A.2 above.

A solution of 20.0 g (69 mmol) of lithium bis-(trifluoromethanesulfonyl)imide in 20 mL of distilled water is added to a solution of 20.0 g (68 mmol) of [EPipMIBK]Br in 20 mL of distilled water. The mixture is stirred for 2 h at ambient temperature. The biphasic mixture is then separated. The organic phase is washed with water until the silver nitrate test is negative and then the ionic liquid is dried under vacuum at 80° C. for 3 h. The compound [EPipMIBK]NTf$_2$ obtained, noted as LI1, is in the form of a viscous yellow oil (32.1 g, i.e. a yield of 95%).

The compounds LI2 to LI7 were synthesised from the compounds I2 to I7, respectively, in accordance with the operating protocol described just above.

Table 3 below brings together the data relating to the ionic liquids LI1 to LI7 thus synthesised.

TABLE 3

| Compound LI | Compound I | Abbreviation of the Compound LI | Yield (%) |
|---|---|---|---|
| LI1 | I1 | [EPipMIBK]Br | [EPipMIBK]NTf$_2$ | 95 |
| LI2 | I2 | [EPipAcP]Br | [EPipAcP]NTf$_2$ | 95 |
| LI3 | I3 | [EPipMAcP]Br | [EPipMAcP]NTf$_2$ | 95 |
| LI4 | I4 | [MIMMIBK]Br | [MIMMIBK]NTf$_2$ | 95 |
| LI5 | I5 | [PyMIBK]Br | [PyMIBK]NTf$_2$ | 95 |
| LI6 | I6 | [EPipPin]I | [EPipPin]NTf$_2$ | 95 |
| LI7 | I7 | [MIMPin]Cl | [MIMPin]NTf$_2$ | 95 |

The semi-structural formulas and characterisation data of these compounds LI1 to LI7 are the following:

Compound LI1: N-ethyl-N-(4-methyl-2-oxopentyl)-piperidinium bis-(trifluoromethanesulfonyl)imide, [EPipMIBK]NTf$_2$, Having the Formula

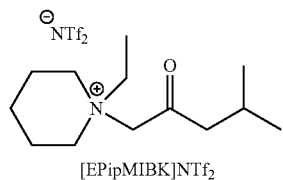

[EPipMIBK]NTf$_2$ $^1$H NMR (400 MHz, CDCl$_3$) δ (ppm): 0.90 (d, 3H, J=6.5 Hz, CH$_3$); 1.23 (t, 3H, J=7.5 Hz, CH$_3$—CH$_2$—N); 1.70 (m, 2H, CH$_2$); 1.87 (m, 4H, CH$_2$); 2.12 (m, 1H, CH); 2.39 (d, 2H, J=7.0 Hz, C(O)—CH$_2$); 3.44 (m, 2H, CH$_2$—N); 3.62 (m, 2H, CH$_2$—N); 3.72 (q, 2H, J=7.5 Hz, CH$_3$—CH$_2$—N); 4.22 (s, 2H, N—CH$_2$—C(O)).

$^{13}$C NMR (100 MHz, CDCl$_3$) δ (ppm): 7.4 (CH$_3$—CH$_2$—N); 19.5; 20.6 (CH$_2$); 22.1 (CH$_3$); 24.2 (CH); 49.5 (C(O)—CH$_2$); 55.0 (CH$_3$—CH$_2$—N); 60.0 (CH$_2$—N); 61.8 (N—CH$_2$—C(O)); 115.1-118.2-121.4-124.6 (q, J=321 Hz, CF$_3$); 201.6 (C(O)).

Compound LI2: N-ethyl-N-acetophenone piperidinium bis-(trifluoromethanesulfonyl)imide, [EPipAcP]NTf$_2$, Having the Formula

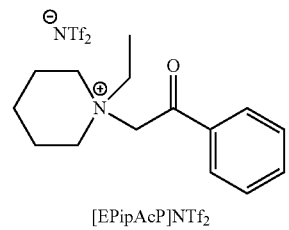 [SMILES: CC[N+]1(CC(=O)c2ccccc2)CCCCC1 ; "NTf2"]

[EPipAcP]NTf$_2$ $^1$H NMR (400 MHz, CDCl$_3$) δ (ppm): 1.28 (t, 3H, J=7.5 Hz, CH$_3$—CH$_2$—N); 1.76 (m, 2H, CH$_2$); 1.94 (m, 4H, CH$_2$); 3.60 (m, 2H, CH$_2$—CH$_2$—N); 3.85 (m, 4H, J=7.5 Hz, CH$_3$—CH$_2$—N, CH$_2$—CH$_2$—N); 4.85 (s, 2H, N—CH$_2$—C(O)); 7.52 (t, 2H, J=7.5 Hz, CH$_{Ar}$); 7.67 (t, 1H, J=7.5 Hz, CH$_{Ar}$); 8.00 (d, 2H, J=7.5 Hz, CH$_{Ar}$).

$^{13}$C NMR (100 MHz, CDCl$_3$) δ (ppm): 7.7 (CH$_3$); 19.8; 20.8 (CH$_2$); 55.2 (CH$_3$—CH$_2$—N); 59.6 (CH$_2$—N); 60.7 (N—CH$_2$—C(O)); 115.1-118.2-121.4-124.6 (q, J=321 Hz, CF$_3$); 128.3; 129.4 (CH$_{Ar}$); 133.7 (C$_{Ar}$); 135.5 (CH$_{Ar}$); 190.3 (C(O)).

Compound LI3: N-ethyl-N-4'-methylacetophenone piperidinium bis-(trifluoromethanesulfonyl)imide, [EPipMAcP]NTf$_2$, Having the Formula

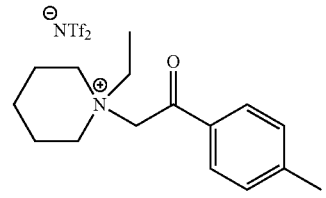

[EPipMAcP]NTf$_2$ $^1$H NMR (400 MHz, CDCl$_3$) δ (ppm): 1.28 (t, 3H, J=7.5 Hz, CH$_3$—CH$_2$—N); 1.76 (m, 2H, CH$_2$); 1.94 (m, 4H, CH$_2$); 3.60 (m, 2H, CH$_2$—CH$_2$—N); 3.85 (m, 4H, J=7.5 Hz, CH$_3$—CH$_2$—N, CH$_2$—CH$_2$—N); 4.85 (s, 2H, N—CH$_2$—C(O)); 7.52 (t, 2H, J=7.5 Hz, CH$_{Ar}$); 7.67 (t, 1H, J=7.5 Hz, CH$_{Ar}$); 8.00 (d, 2H, J=7.5 Hz, CH$_{Ar}$).

$^{13}$C NMR (100 MHz, CDCl$_3$) δ (ppm): 7.7 (CH$_3$); 19.9; 20.8 (CH$_2$); 21.8 (CH$_3$—Ar); 22.0 (CH$_3$—CH$_2$—N); 51.2 (CH$_3$—CH$_2$—N); 59.5 (CH$_2$—N); 60.8 (N—CH$_2$—C(O)); 115.1-118.2-121.4-124.6 (q, J=321 Hz, CF$_3$); 128.5; 130.1 (CH$_{Ar}$); 131.2 (C$_{Ar}$); 147.1 (C$_{Ar}$); 189.7 (C(O)).

Compound LI4: N-methyl-N-(4-methyl-2-oxopentyl)imidazolium bis-(trifluoromethanesulfonyl)imide, [MIMMIBK]NTf$_2$, Having the Formula

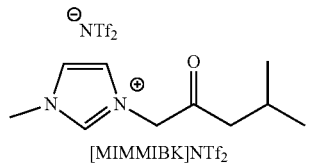

[MIMMIBK]NTf$_2$ $^1$H NMR (400 MHz, CDCl$_3$) δ (ppm): 0.96 (d, 3H, J=6.5 Hz, CH$_3$); 2.17 (m, 1H, CH); 2.51 (d, 2H, J=7.0 Hz, C(O)—CH$_2$); 3.96 (s, 3H, CH$_3$—N); 5.2 (s, 2H, N—CH$_2$—C(O)); 7.46 (t, 1H, J=2.0 Hz, CH$_{Ar}$); 7.57 (t, 1H, J=2.0 Hz, CH$_{Ar}$); 8.77 (s, 1H, J=2.0 Hz, CH$_{Ar}$).
$^{13}$C NMR (100 MHz, CD$_3$OD) δ (ppm): 22.8 (CH$_3$); 25.3 (CH); 36.6 (CH$_3$—Ar); 49.1 (C(O)—CH$_2$); 58.4 (N—CH$_2$—C(O)); 116.4-119.6-122.8-126.0 (q, J=321 Hz, CF$_3$); 124.4 (CH$_{Ar}$); 125.0 (CH$_{Ar}$); 139.0 (CH$_{Ar}$); 202.3 (C(O)).

Compound LI5: N-(4-methyl-2-oxopentyl)pyridinium bis-(trifluoromethanesulfonyl)imide, [PyMIBK]NTf$_2$, Having the Formula

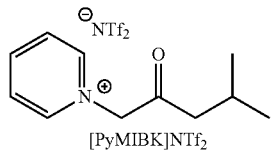

[PyMIBK]NTf$_2$ $^1$H NMR (400 MHz, CDCl$_3$) δ (ppm): 1.00 (d, 3H, J=6.5 Hz, CH$_3$); 2.20 (m, 1H, CH); 2.61 (d, 2H, J=7.0 Hz, C(O)—CH$_2$); 5.67 (s, 2H, N—CH$_2$—C(O)); 8.14 (m, 2H, CH$_{Ar}$); 8.66 (tt, 1H, J=8.0 Hz; J=1.5 Hz, CH$_{Ar}$); 8.74 (m, 2H, CH$_{Ar}$).
$^3$C NMR (100 MHz, CD$_3$OD) δ (ppm): 22.9 (CH$_3$); 25.3 (CH); 49.1 (C(O)—CH$_2$); 69.6 (N—CH$_2$—C(O)); 116.4-119.6-122.8-126.0 (q, J=321 Hz, CF$_3$); 129.2 (CH$_{Ar}$); 147.3 (CH$_{Ar}$); 147.6 (CH$_{Ar}$); 201.4 (C(O)).

Compound LI6: N-ethyl-N-pinacolone piperidinium bis-(trifluoromethanesulfonyl)imide, [EPipPin]NTf$_2$, Having the Formula

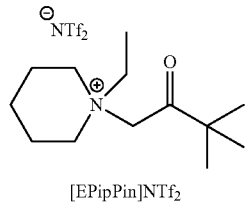

[EPipPin]NTf$_2$ $^1$H NMR (400 MHz, CDCl$_3$) δ (ppm): 1.23 (s, 9H, CH$_3$); 1.26 (t, 3H, J=7.5 Hz, CH$_3$—CH$_2$—N); 1.75 (m, 2H, CH$_2$); 1.88 (m, 4H, CH$_2$); 3.54 (m, 2H, CH$_2$—N); 3.68 (m, 2H, CH$_2$—N); 3.74 (q, 2H, J=7.5 Hz, CH$_3$—CH$_2$—N); 4.40 (s, 2H, N—CH$_2$—C(O)).

$^{13}$C NMR (100 MHz, CDCl$_3$) δ (ppm): 7.6 (CH$_3$—CH$_2$—N); 19.8; 20.8 (CH$_2$); 26.1 (CH$_3$); 45.1 (C(O)—C—(CH$_3$)$_3$); 53.6 (CH$_3$—CH$_2$—N); 59.5 (N—CH$_2$—C(O)); 60.1 (CH$_2$—N); 115.1-118.2-121.5-124.7 (q, J=321 Hz, CF$_3$); 207.6 (C(O)).

Compound LI7: N-pinacolone methylimidazolium bis-(trifluoromethanesulfonyl)imide, [MIMPin]NTf$_2$, Having the Formula

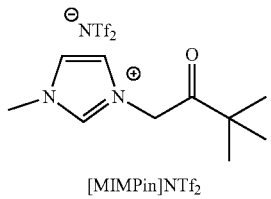

[MIMPin]NTf$_2$ $^1$H NMR (400 MHz, CDCl$_3$) δ (ppm): 1.25 (s, 9H, CH$_3$); 3.94 (s, 3H, CH$_3$—Ar); 5.31 (s, 2H, N—CH$_2$—C(O)); 7.28 (3, 2H, CH$_{Ar}$); 8.69 (S, 1H, CH$_{Ar}$).
$^{13}$C NMR (100 MHz, CDCl$_3$) δ (ppm): 26.0 (CH$_3$); 36.5 (CH$_3$—N); 43.6 ((CH$_3$)$_3$—C—C(O)); 53.9 (C(O)—CH$_2$—N); 115.1-118.2-121.4-124.6 (q, J=321 Hz, CF$_3$); 122.8 (CH$_{Ar}$); 124.1 (CH$_{Ar}$); 137.7 (CH$_{Ar}$); 206.0 (C(O)).

1.2.2 Compound I8 Obtained According to the Pathway B

The exchange of the halide anion of the Compound I8 synthesised in chapter B.3 above by the anion NTf$_2^-$ is carried out according to the following reaction (2"bis):

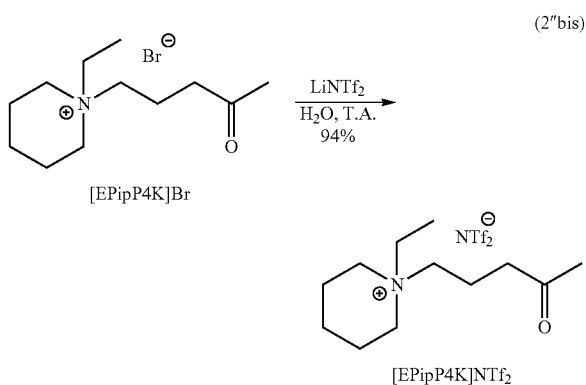

The synthesis protocol followed for the synthesis of the Compound LI8 is the following: a solution of 5.5 g (20 mmol) of lithium bis-(trifluoromethanesulfonyl)imide in 10 mL of distilled water is added to a solution of 5.28 g (19.5 mmol) of [EPipP4K]Br in 10 mL of deionised water. The mixture is then stirred for 3 h. The aqueous phase is then eliminated. The product is then washed with water (3 times with 15 mL) and then dissolved in dichloromethane. The mixture is then dried over magnesium sulphate, filtered and concentrated under vacuum. The 1-ethyl-4-oxopentyl-piperidinium bis-(trifluoromethanesulfonyl)imide, or [EPipP4K]NTF$_2$, noted as LI8, thus obtained is in the form of a yellow oil (7.6 g, i.e. a yield of 83%).

The characterisation data of this Compound LI8 are the following:

$^1$H NMR (400 MHz, CDCl$_3$) δ (ppm): 1.34 (t, J=7.5 Hz, CH$_3$—CH$_2$—N); 1.71 (m, 2H, CH$_2$—CH$_2$—CH$_2$—N); 1.80-1.96 (m, 6H, CH$_2$—CH$_2$—CH$_2$—N; (O)C—CH$_2$—CH$_2$—CH$_2$—N); 2.15 (s, 3H, CH$_3$—(O)C); 2.64 (t, J=6.0 Hz, 2H, (O)C—CH$_2$—CH$_2$—CH$_2$—N); 3.21 (m, 2H, (O)C—CH$_2$—CH$_2$—CH$_2$—N); 3.25-3.37 (m, 6H, CH$_2$—CH$_2$—CH$_2$—N; CH$_3$—CH$_2$—N).

$^{13}$C NMR (100 MHz, CDCl$_3$) δ (ppm): 7.0 (CH$_3$—CH$_2$—N); 15.4; 19.5 (CH$_2$—CH$_2$—CH$_2$—N; (O)C—CH$_2$—CH$_2$—CH$_2$—N); 20.9 (CH$_2$—CH$_2$—CH$_2$—N); 29.8 (C(O)—CH$_3$); 38.6 ((O)C—CH$_2$—CH$_2$—CH$_2$—N); 54.7; 56.3 (CH$_2$—CH$_2$—CH$_2$—N); 59.2 (CH$_3$—CH$_2$—N); 115.1-118.3-121.5-124.7 (q, J=321 Hz, CF$_3$); 207.3 (C(O)).

Example 2: Synthesis of an Ionic Liquid LI9 Comprising an Alcohol Function

This ionic liquid LI9 can be synthesised according to the following reaction (3bis):

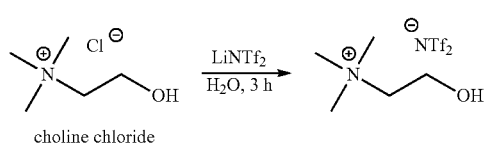

(3bis)

choline chloride

The corresponding operating protocol is the following: a solution of 10.3 g (36 mmol) of lithium bis-(trifluoromethanesulfonyl)imide in 20 mL of water is added to a solution of 5 g (36 mmol) of choline chloride in 20 mL of water. The mixture is stirred for 3 h at ambient temperature, then the phases are separated. The ionic liquid is washed two times with 30 mL of water and then dried under vacuum.

The characterisation data of this Compound LI9 are the following:

$^1$H NMR (400 MHz, DMSO-d$_6$) δ (ppm): d 5.27 (t, 1H), 3.83 (m, 2H), 3.39 (m, 2H), 3.10 (s, 9H).

Example 3: Synthesis of an Ionic Liquid LI10 Comprising a Phosphonate Function As described above, the ionic liquids comprising a phosphonate function can be synthesised according to the following reaction (6):

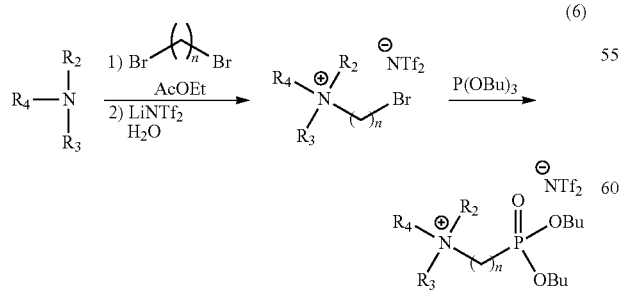

(6)

The ionic liquid LI10 is synthesised from ethylpiperidine, according to the following operating protocol:

3.1 Synthesis of (4-bromobutyl)-ethylpiperidinium bromide [EPipBPhos]Br 15 mL (122 mmol) of dibromobutane are added to a solution of 9 mL (66 mmol) of ethylpiperidine in 50 mL of ethyl acetate. The mixture is then stirred at 50° C. for one night. After cooling, the solid is filtered, washed with diethyl ether (two times with 30 mL) and dried under vacuum. The (4-bromobutyl)-ethylpiperidinium bromide (14.8 g, i.e. a yield of 68%) that is in the form of a white solid is obtained.

The characterisation data of this compound are the following:

$^1$H NMR (400 MHz, CDCl$_3$) δ (ppm): 1.36 (t, J=7.5 Hz, 3H, CH$_3$—CH$_2$—N); 1.77-1.85 (m, 2H, CH$_2$—CH$_2$—CH$_2$—N); 1.90-2.05 (m, 4H, CH$_2$—CH$_2$—CH$_2$—N); 2.31-2.41 (m, 2H, CH$_2$—CH$_2$—CH$_2$—Br); 3.62 (t, J=6.0 Hz, 2H, CH$_2$—Br); 3.67-3.77 (m, 8H, CH$_2$—N).

$^{13}$C NMR (100 MHz, CDCl$_3$) δ (ppm): 7.3 (CH$_3$—CH$_2$—N); 20.0 (CH$_2$—CH$_2$—CH$_2$—N); 20.8 (CH$_2$—CH$_2$—CH$_2$—N); 25.0 (N—CH$_2$—CH$_2$—CH$_2$—Br); 29.6 (N—CH$_2$—CH$_2$—CH$_2$—Br); 54.6 (CH$_3$—CH$_2$—N); 56.2 (N—CH$_2$—CH$_2$—CH$_2$—Br); 59.2 (CH$_2$—CH$_2$—CH$_2$—N).

3.2 Synthesis of (4-bromobutyl)-ethylpiperidinium bis-(trifluoromethanesulfonyl)imide A solution of 10.8 g (38 mmol) of lithium bis-(trifluoromethanesulfonyl)imide in 10 mL of water is added to a solution of 12.3 g (37 mmol) of (4-bromobutyl)-ethylpiperidinium bromide in 30 mL of water. The mixture is stirred for 3 h at ambient temperature and then the phases are separated. The ionic liquid is washed 3 times with 30 mL of water and then dried under vacuum. The (4-bromobutyl) ethylpiperidinium bis-(trifluoromethanesulfonyl)imide (16.32 g, i.e. a yield of 83%) obtained is in the form of a colourless viscous oil.

The characterisation data of this compound are the following:

$^1$H NMR (400 MHz, CD$_2$Cl$_2$) δ (ppm): 1.36 (t, J=7.5 Hz, 3H, CH$_3$); 1.73-1.79 (m, 2H, CH$_2$—CH$_2$—CH$_2$—N); 1.89-1.96 (bs, 4H, CH$_2$—CH$_2$—CH$_2$—N); 2.22-2.31 (m, 2H, CH$_2$—CH$_2$—CH$_2$—Br); 3.30-3.34 (m, 8H, CH$_2$—N); 3.55 (t, J=6.0 Hz, 2H, CH$_2$—Br)

$^{13}$C NMR (100 MHz, CD$_2$Cl$_2$) δ (ppm): 6.9 (CH$_3$—CH$_2$—N); 19.5 (CH$_2$—CH$_2$—CH$_2$—N); 20.8 (CH$_2$—CH$_2$—CH$_2$—N); 24.4 (N—CH$_2$—CH$_2$—CH$_2$—Br); 28.7 (N—CH$_2$—CH$_2$—CH$_2$—Br); 54.6 (CH$_3$—CH$_2$—N); 56.6 (N—CH$_2$—CH$_2$—CH$_2$—Br); 59.2 (CH$_2$—CH$_2$—CH$_2$—N); 115.1-118.2-121.4-124.6 (q, J=321 Hz, CF$_3$)

3.3 Synthesis of (4-(dibutoxyphosphory)butyl)-ethylpiperidinium bis-(trifluoromethanesulfonyl)imide [EPipBPhos]NTf$_2$, or Compound LI10 Having the Formula

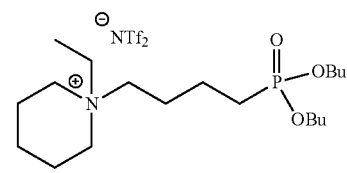

[EPipBPhos]NTf$_2$

A mixture of 16.32 g (31 mmol) of (4-bromobutyl)-ethylpiperidinium bis-(trifluoromethanesulfonyl)imide and of 25 mL (92 mmol) of tributylphosphite is stirred at 160° C. for 1 h. After cooling, the mixture is washed two times with ether and the compound is dried under vacuum. The (4-(dibutoxyphosphory)butyl)-ethylpiperidinium bis-(trifluoromethanesulfonyl)imide [EPipBPhos]NTf$_2$ obtained, noted as LI10, is in the form of a colourless oil (16.9 g, i.e. a yield of 85%).

The characterisation data of this Compound LI10 are the following:

$^1$H NMR (400 MHz, CDCl$_3$) δ (ppm): 0.93 (t, J=7.5 Hz, 6H, CH$_3$—(CH$_2$)$_3$—O); 1.32 (t, J=7.5 Hz, 3H, CH$_3$—CH$_2$—N); 1.36-1.43 (m, 4 h, CH$_3$—CH$_2$—(CH$_2$)$_2$—O); 1.60-1.88 (m, 16H, CH$_2$—P; CH$_2$); 3.24 (m, 2H, CH$_2$—N); 3.31-3.40 (m, 6H, CH$_2$—N); 4.0 (m, 4H, O—CH$_2$—(CH$_2$)$_3$—CH$_3$)

$^{13}$C NMR (100 MHz, CDCl$_3$) δ (ppm): 7.2 (CH$_3$); 13.6 (CH$_3$—(CH$_2$)$_3$—O); 18.8 (CH$_3$—CH$_2$—(CH$_2$)$_2$—O); 19.7 (CH$_2$—CH$_2$—N); 20.0; 20.9; 21.6; 21.7 (CH$_2$—CH$_2$—N); 23.5-25.0 (d, J=140.0 Hz, CH$_2$—P); 32.5; 32.6 (d, J=6.5 Hz, CH$_3$—CH$_2$—CH$_2$—CH$_2$—O); 54.0; 57.9; 59.2 (CH$_2$—N); 65.6 (d, J=7.0 Hz, CH$_2$—O); 115.2-118.3-121.5-124.7 (q, J=321 Hz, CF$_3$)

$^{31}$P NMR (160 MHz, CDCl$_3$) δ (ppm): 30.3

Extractive Properties of the Ionic Liquids

Methods of Evaluating the Extractive Properties

The extractive properties of the ionic liquids were evaluated by the measurement of the coefficients of distribution of the species in solution, by means of Inductively Coupled Plasma-Optical Emission Spectrometry or ICP-OES.

The efficiency of extraction, or of stripping, is evaluated by the determination of the percentage of extraction, or of stripping, from the coefficient of distribution, as explained below.

The coefficient of distribution of a metal element M, noted as $D_M$, between the phase consisting of the ionic liquid (noted as "A2") and the aqueous phase (noted as "A1") is determined by the following equation:

$$D_M = \frac{[M]_{A2}}{[M]_{A1}}$$

with $[M]_{A2}$=concentration of the metal element M in the ionic liquid after extraction (in mg/L), and
$[M]_{A1}$=concentration of the metal element M in the aqueous phase after extraction (in mg/L).

The percentage of stripping, noted as E (%), is determined by the following equation:

$$E(\%) = \frac{[M]_{A2}}{[M]_{A1\,initial}} \times 100 = \frac{D_M}{D_M + \left(\frac{V_{A1}}{V_{A2}}\right)} \times 100$$

with $[M]_{A2}$=concentration of the metal element M in the ionic liquid after extraction (in mg/L)
$[M]_{A1\,initial}$=concentration of the metal element M in the aqueous phase before extraction (in mg/L)
$D_M$=coefficient of distribution of the metal element M,
$V_{A1}$=volume of the aqueous phase, and
$V_{A2}$=volume of the ionic liquid.

The percentage of stripping, noted as Déses (%), is determined by the following equation:

$$Désex\,(\%) = \frac{[M]_{A3}}{[M]_{A2}} \times 100$$

with $[M]_{A3}$=concentration of the metal element M in the aqueous phase after stripping (in mg/L), and
$[M]_{A2}$=concentration of the metal element M in the ionic liquid after extraction and before stripping (in mg/L).

The selectivity of the extraction of the metal M1 with respect to the metal M2, noted as S, is determined by the following equation:

$$S = \frac{D_{M1}}{D_{M2}}$$

with $D_{M1}$=coefficient of distribution of the metal element M1, and
$D_{M2}$=coefficient of distribution of the metal element M2.

Operating Protocols

The acid aqueous phases A1 were prepared by dilution, in sulphuric acid, of Ta in the oxidation state V and in the form of NH$_4$TaF$_6$ containing 1% hydrofluoric acid in ion-exchanged water, from the company SCP Science.

The compositions of the acid aqueous phases A1, before contact, are the following, with the unit "M" used below and hereinafter corresponding to the abbreviation of the International System unit "mol/L":

[Ta]: from 1 g/L to 10 g/L,
[H$_2$SO$_4$]: from 0M to 9M,
with optional addition of niobium Nb and europium Eu, in order to approach the conditions encountered with an acid aqueous phase consisting of an acid digestion solution a concentrate of a natural ore in which Nb is present with Ta,
with optional addition of niobium Nb, iron Fe, manganese Mn, nickel Ni and silver Ag, in order to approach the conditions encountered with an acid aqueous phase consisting of an acid digestion solution of a concentrate of a phosphate ore that contains mainly Ta, Nb, Fe and Mn, or of an urban ore from capacitors from W3E that contain mainly Ta, Mn, Ni and Ag.

The aqueous phase A3 used for the strippings consists of water.

The extractions are carried out by bringing the acid aqueous phase A1 into contact with the ionic liquid A2 considered in a volume ratio between the acid aqueous phase and the ionic liquid $V_{A1}/V_{A2}$ ranging from 1 to 16.

The acid aqueous phase A1 and the ionic liquid A2 are put in contact for 1 h and at a temperature between 20° C. and 25° C. and then centrifuged for 5 min at 4000 rpm at 20° C. and separated.

The strippings are carried out in the same time of contact, temperature and centrifugation conditions, except for the volume ratio between the aqueous phase A3 and the ionic liquid $V_{A3}/V_{A2}$ that is 1 or 2.

The dosage of the metal elements present in the aqueous phases is carried out by ICP-OES analysis.

Experimental Results

Example 4: Extraction by Ionic Liquids Comprising a Ketone Function 4.1 In order to determine the effect of the molar concentration of sulphuric acid of the aqueous phase A1 on the extraction performance, a first series of extractions was carried out by bringing the following phases A1 and A2 into contact in equal volumes:

Aqueous phase A1: [Ta]=1 g/L in variable concentrations of sulphuric acid ([H$_2$SO$_4$]=from 0M to 9M)

Phase A2: Ionic liquid LI1: [EPipMIBK]NTf$_2$

The calculated values for the coefficients of distribution of the tantalum D$_{Ta}$ and the percentages of extraction E (%) and of stripping Désex (%) are reported in table 4.1.

TABLE 4.1

| [H$_2$SO$_4$] (in M) | D$_{Ta}$ | E (%) | Désex (%) |
|---|---|---|---|
| 0 | 0.1 | 9.1 | — |
| 0.01 | 0.1 | 9.1 | — |
| 0.1 | 0.15 | 13.0 | — |
| 1 | 0.3 | 23.1 | — |
| 3 | 10.3 | 91.1 | 85 |
| 6 | 43.5 | 97.7 | 100 |
| 9 | 40.2 | 97.6 | 100 |

Also in reference to FIG. 1, which illustrates the change in the coefficient of distribution D$_{Ta}$ according to the molar concentration of sulphuric acid in the aqueous phase A1, it is observed that the extraction of Ta, which only begins from a concentration of 3M of sulphuric acid (91.1%), is more particularly efficient at concentrations of 6M and 9M of sulphuric acid, for which 97.5% to 97.7% of Ta is extracted, respectively. Moreover, at these two latter concentrations, it is observed that it was possible to obtain a complete stripping of Ta from the ionic liquid LI1, after two washings with water.

4.2 In order to determine the effect of the molar concentration of sulphuric acid of the aqueous phase A1 on the selectivity of the extraction, a second series of extractions was carried out by bringing the following phases A1 and A2 into contact in equal volumes:

Aqueous phase A1: [Ta]=[Nb]=1 g/L, [Eu]=1.5 g/L in variable concentrations of sulphuric acid ([H$_2$SO$_4$]=from 3M to 9M)

Phase A2: Ionic liquid LI1: [EPipMIBK]NTf$_2$

Figure 2:
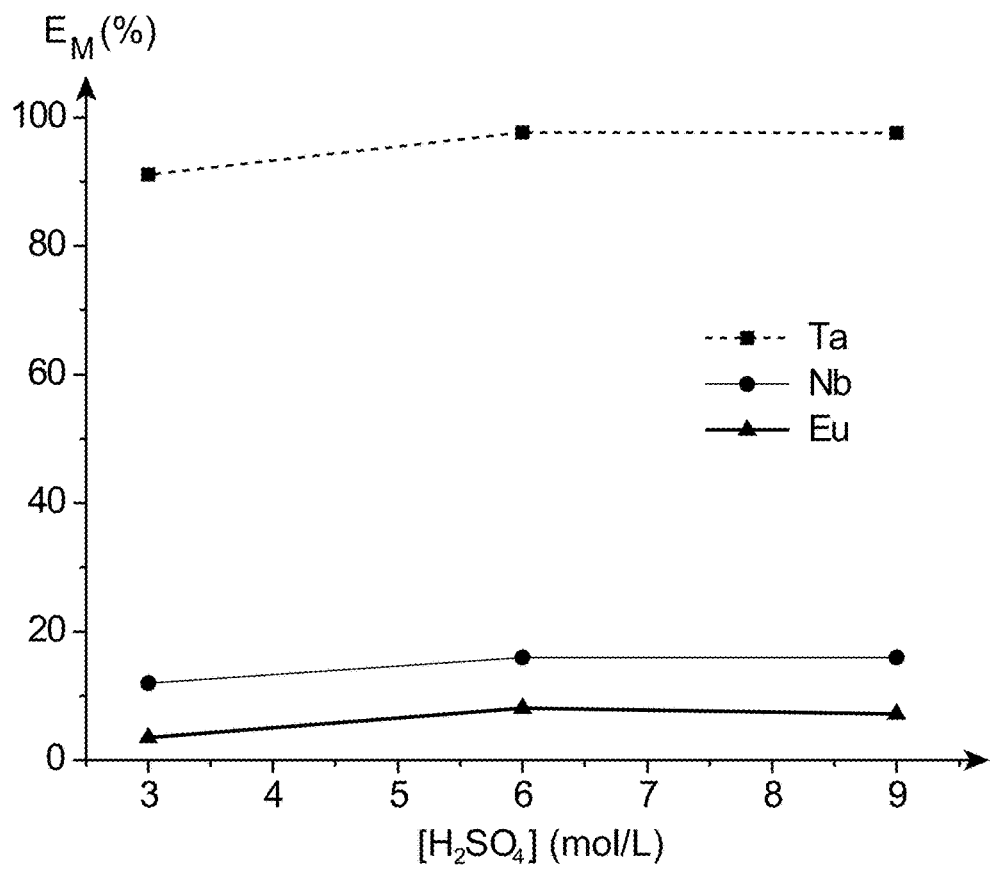
FIG. 2 illustrates the effect of the molar concentration of sulphuric acid of an aqueous phase A1 comprising Ta, Nb and Eu on the percentages of extraction of these metals (noted as $E_M$) when these metals are extracted from this aqueous phase by means of a phase A2 consisting of [EPipMIBK]NTf$_2$.

The percentages of extraction E$_M$ (%) of each of the metals Ta, Nb and Eu initially present in the aqueous phase A1 are illustrated in FIG. 2. According to this FIG. 2, it is observed that Ta is extracted at a level of 91% and up to 98% according to the molar concentration of sulphuric acid in the aqueous phase A1. Nb and Eu are practically not extracted at all from the aqueous phase A1.

The percentages of extraction E (%) and of stripping Désex (%) of the tantalum, as well as the values calculated for the selectivity of the Ta with respect to Nb and Eu, noted as S$_{Ta/Nb}$ and S$_{Ta/Eu}$, respectively, are reported in table 4.2 below:

TABLE 4.2

| [H$_2$SO$_4$] (in M) | E (%) | Désex (%) | S$_{Ta/Nb}$ | S$_{Ta/Eu}$ |
|---|---|---|---|---|
| 3 | 91.1 | 95 | 130 | 375 |
| 6 | 97.7 | 100 | 237 | 495 |
| 9 | 97.6 | 100 | 210 | 515 |

The results of table 4.2 show that the ionic liquid LI1 is a very selective extractant of tantalum, regardless of the molar concentration of sulphuric acid of the aqueous phase A1, and that the tantalum can be completely stripped.

4.3 In order to determine the effect of the nitrogen portion of the cation of the ionic liquid of the phase A2 on the extraction performance, a third series of extractions was carried out by bringing the following phases A1 and A2 into contact in equal volumes:

Aqueous phase A1: [Ta]=7 g/L, in sulphuric acid ([H$_2$SO$_4$]=6M)

Phase A2: Ionic liquid: LI1, LI4 and LI5

The calculated values for the coefficients of distribution of the tantalum D$_{Ta}$, as well as the percentages of extraction E (%) and of stripping Désex (%), are reported in table 4.3 below:

TABLE 4.3

| | Phase A2 | | D$_{Ta}$ | E (%) | Désex (%) |
|---|---|---|---|---|---|
| LI1 | [EPipMIBK]NTf$_2$ | | 43.5 | 97.7 | 100 |
| LI4 | [MIMMIBK]NTf$_2$ | | 23.7 | 96.0 | 86 |
| LI5 | [PyMIBK]NTf$_2$ | | 20.9 | 95.4 | 86 |

It is observed that the extraction is particularly efficient regardless of the ionic liquid chosen out of LI1, LI4 and LI5, the extraction percentages ranging between 95.4% and 97.7%.

4.4 In order to determine the effect of the ketone portion of the cation of the ionic liquid of the phase A2 on the extraction performance, a fourth series of extractions was carried out by bringing the following phases A1 and A2 into contact in equal volumes:

Aqueous phase A1: [Ta]=1 g/L or [Ta]=7 g/L, in sulphuric acid ([H$_2$SO$_4$]=6M)

Phase A2: Ionic liquid: LI1, LI2, LI3, LI5, LI6 or LI7

The calculated values for the coefficients of distribution of the tantalum D$_{Ta}$, as well as the percentages of extraction E (%) and of stripping Désex (%), for each mass concentration of Ta, are reported in table 4.4 below:

TABLE 4.4

| | Phase A2 | | [Ta] = 1 g/L | | | [Ta] = 7 g/L | | |
|---|---|---|---|---|---|---|---|---|
| | | | DTa | E (%) | Désex (%) | DTa | E (%) | Désex (%) |
| LI1 | [EPipMIBK]NTf$_2$ | (structure) | 43.5 | 97.7 | 100 | 33 | 97.1 | 94 |
| LI2 | [EPipAcP]NTf$_2$ | (structure) | 17.2 | 94.5 | 20 | 4.2 | 80.1 | 31 |
| LI3 | [EPipMAcP]NTf$_2$ | (structure) | 4.5 | 81.8 | 22 | Not carried out | | |
| LI6 | [EPipPin]NTf$_2$ | (structure) | 35.7 | 97.2 | 43 | 20.0 | 95.2 | 95 |
| LI7 | [MIMPin]NTf$_2$ | (structure) | Not carried out | | | 23.8 | 96.0 | 87 |
| LI8 | [EPipP4K]NTf$_2$ | (structure) | Not carried out | | | 24.4 | 96.1 | 88 |

As is clear from table 4.4, when the ketone function of the ionic liquid comprises an aliphatic chain (here, isobutyl or tertio-butyl), very good extraction results are obtained, with the extraction percentages ranging between 95.2% and 97.7% (ionic liquids LI1, LI6, LI7 and LI8). The ionic liquid LI1, which has a methyl isobutyl ketone (MIBK) group, has slightly better performance than the ionic liquid LI6 that has a tertbutyl group.

When the ketone function of the ionic liquid comprises an aromatic group (LI2 and LI3), the performance of the extraction falls because of the high viscosity of the corresponding ionic liquids, said viscosity forming an obstacle to the extraction and stripping.

Table 4.4 also shows the fact that the extraction decreases substantially when the concentration of Ta increases.

The ionic liquid LI1 [EPipMIBK]NTf$_2$ is the extractant with the best performance.

4.5 In order to evaluate the ability of the ionic liquid L1 [EPipMIBK]NTf$_2$ to be reused, recycling tests were carried out by placing the following initial phases A1 and A2 in contact in equal volumes:

Aqueous phase A1: [Ta]=7 g/L, in sulphuric acid ([H$_2$SO$_4$]=6M)
Phase A2: Ionic liquid: LI1

After a first cycle of extraction/stripping (cycle 1), the ionic liquid LI1 as obtained after the stripping is used for a second extraction/stripping cycle (cycle 2) followed by a third (cycle 3). The results of these recycling tests are reported in table 4.5 below:

TABLE 4.5

| Cycle | $D_{Ta}$ | E (%) | Désex (%) |
|---|---|---|---|
| 1 | 33.4 | 97 | 94 |
| 2 | 27.2 | 96.4 | 93 |
| 3 | 30.8 | 96.9 | 96 |

Table 4.5 shows that the ionic liquid LI1 was recycled 3 times without losing efficiency.

4.6 In order to determine the performance of extraction of the Ta from an aqueous phase A1 comprising a plurality of metal elements, a fourth series of extractions was carried out by bringing the following phases A1 and A2 into contact in equal volumes:

Aqueous phase A1: [Ta]=[Nb]=[Fe]=[Ni]=[Mn]=[Ag]=2 g/L, in variable concentrations of sulphuric acid ([$H_2SO_4$]=from 0.1M to 9M)

Phase A2: Ionic liquid: LI1

Figure 3:
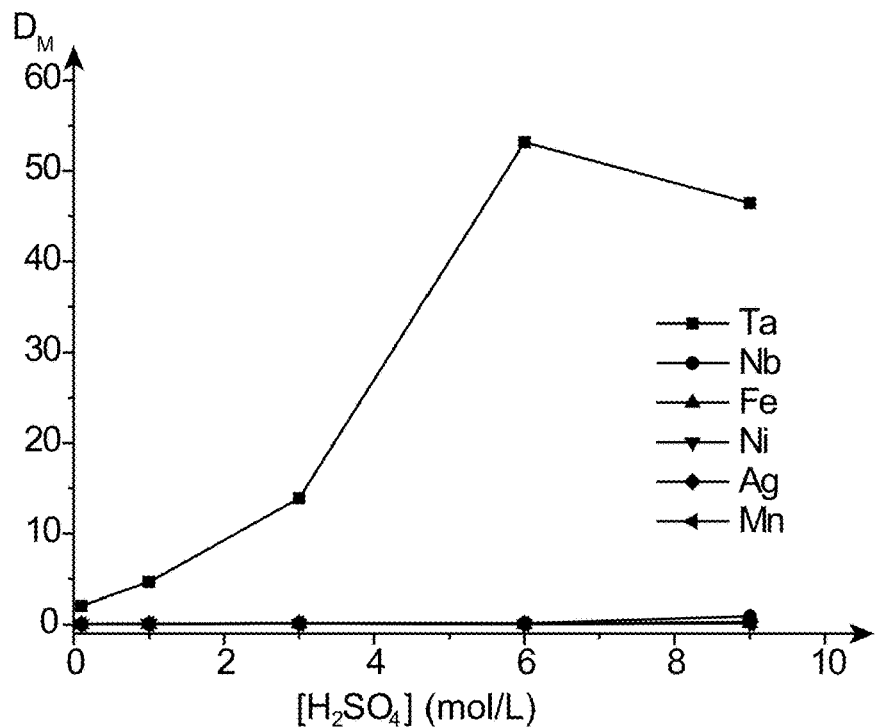
FIG. 3 illustrates the effect of the molar concentration of sulphuric acid of an aqueous phase A1 comprising Ta, Nb, Fe, Ni, Mn and Ag on the coefficient of distribution of each of these metals M (noted as $D_M$) when the extraction is carried out by means of a phase A2 consisting of [EPipMIBK]NTf$_2$.

In reference to FIG. 3 in which are reported the values of the coefficients of distribution $D_M$ of the various metals M (Ta, Nb, Fe, Ni, Mn and Ag) according to the molar concentration of sulphuric acid, it is observed that the ionic liquid LI1 [EPipMIBK]NTf$_2$ still has very good performance, even in the presence of other competing elements.

Indeed, the coefficients of distribution $D_{Ta}$ are similar to those obtained with an aqueous phase A1 comprising Ta alone (see FIG. 1).

Figure 4:
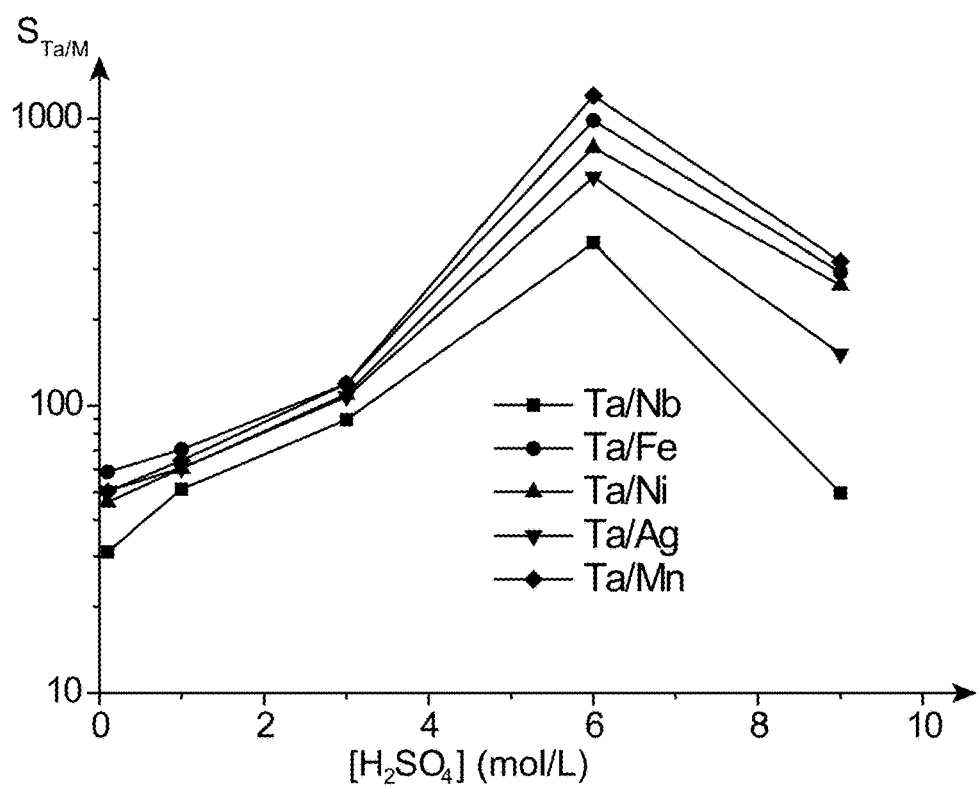
FIG. 4 illustrates the effect of the molar concentration of sulphuric acid of an aqueous phase A1 comprising Ta, Nb, Fe, Ni, Mn and Ag on the selectivity of the extraction of the Ta with respect to each of these metals M (noted as $S_{Ta/M}$) when the extraction is carried out by means of a phase A2 consisting of [EPipMIBK]NTf$_2$.

In reference to FIG. 4 in which are reported the selectivity values $S_{Ta/M}$ of the Ta with respect to each of the other metals Nb, Fe, Ni, Mn and Ag, also present in the aqueous phase A1, according to the molar concentration of sulphuric acid, it is observed that the ionic liquid LI1 [EPipMIBK]NTf$_2$ remains very selective for the Ta, with values for $S_{Ta/M}$ ranging from 30 to 1400 according to the molar concentration of sulphuric acid and the metals considered.

Figure 5:
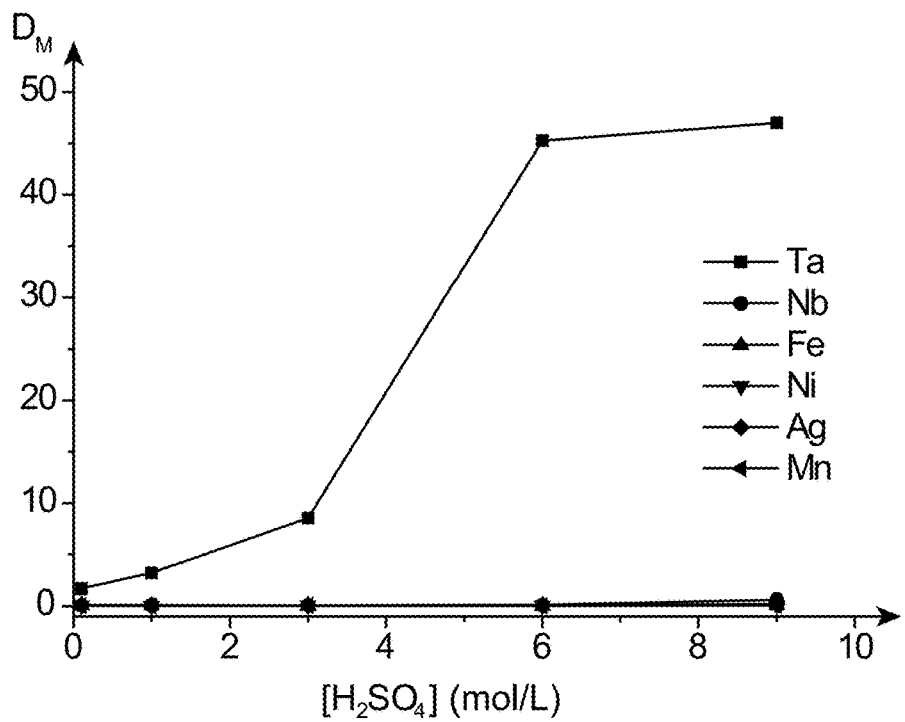
FIG. 5 illustrates the effect of the molar concentration of sulphuric acid of an aqueous phase A1 comprising Ta, Nb, Fe, Ni, Mn and Ag on the coefficient of distribution of each of these metals M (noted as $D_M$), after 3 cycles of extraction-stripping by means of an initial phase A2 consisting of [EPipMIBK]NTf$_2$.

In reference to FIG. 5 in which are reported the values of the coefficients of distribution of the various metals M (Ta, Nb, Fe, Ni, Mn and Ag) according to the molar concentration of sulphuric acid, after recycling tests carried out according to the same operating protocol as that described in paragraph 4.5 above, it is observed that the ionic liquid LI1 [EPipMIBK]NTf$_2$, recycled 3 times, still has particularly good performance. Indeed, the coefficients of distribution $D_{Ta}$ are comparable to those obtained with an aqueous phase A1 comprising Ta alone (see FIG. 1) or further comprising Nb, Fe, Ni, Mn and Ag (see FIG. 3).

Figure 6:
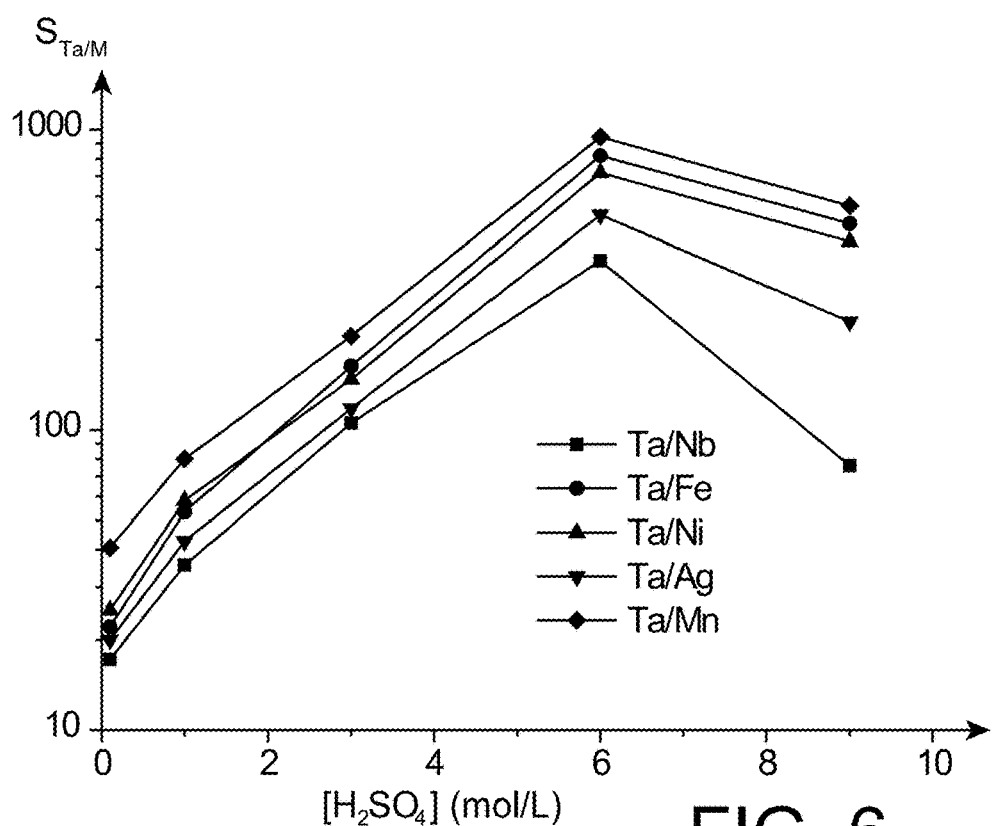
FIG. 6 illustrates the effect of the molar concentration of sulphuric acid of an aqueous phase A1 comprising Ta, Nb, Fe, Ni, Mn and Ag on the selectivity of the extraction of the Ta with respect to each of these metals M (noted as $S_{Ta/M}$), after 3 cycles of extraction-stripping by means of an initial phase A2 consisting of [EPipMIBK]NTf$_2$.

In reference to FIG. 6 in which are reported the selectivity values $S_{Ta/M}$ for the Ta with respect to each of the other metals Nb, Fe, Ni, Mn and Ag, after these same recycling tests, it is observed that the ionic liquid LI1 [EPipMIBK]NTf$_2$, recycled 3 times, remains very selective for the Ta, with values for $S_{Ta/M}$ ranging from 40 to 1000 according to the molar concentration of sulphuric acid and the metals considered.

Example 5: Extraction by Non-Functionalised Ionic Liquids 5.1 A first series of extractions was carried out by bringing the following phases A1 and A2 into contact in equal volumes:

Aqueous phase A1: [Ta]=7 g/L, in sulphuric acid ([$H_2SO_4$]=6M)

Phase A2: Ionic liquid: LI11 or LI12, as specified in table 5 below

The calculated values for the coefficients of distribution of the tantalum $D_{Ta}$, as well as the percentages of extraction E (%) and of stripping Désex (%), after a first and then a second cycle of extraction/stripping, are reported in table 5 below:

TABLE 5

| | Phase A2 | | Cycle 1 | | | Cycle 2 | | |
|---|---|---|---|---|---|---|---|---|
| | | | DTa | E (%) | Désex (%) | DTa | E (%) | Désex (%) |
| LI11 | [EBPip] NTf$_2$ | 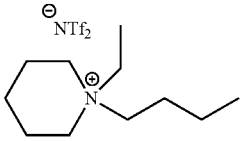 | 41.7 | 97.7 | 72 | 42.8 | 97.7 | 87 |
| LI12 | [BMIM] NTf$_2$ | 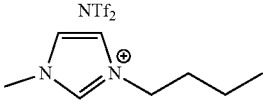 | 17.7 | 94.7 | 74 | 28.9 | 96.7 | 82 |

These non-functionalised ionic liquids LI11 and LI12 have performance that is as good as that of their equivalents functionalised by a ketone group (see in particular LI8, but also LI1, LI6 or even LI4, LI7), with a slight reduction in the performance of stripping of the Ta.

The tendency towards better extraction of the Ta with the piperidine core (LI11) is again observed.

5.2 In order to determine the performance of extraction of the Ta from an aqueous phase A1 comprising a plurality of metal elements, a second series of extractions was carried out by bringing the following phases A1 and A2 into contact in equal volumes:

Aqueous phase A1: [Ta]=[Nb]=[Fe]=[Ni]=[Mn]=[Ag]=2 g/L, in variable concentrations of sulphuric acid ([$H_2SO_4$]=from 0.1M to 9M)

Phase A2: Ionic liquid: LI11

Figure 7:
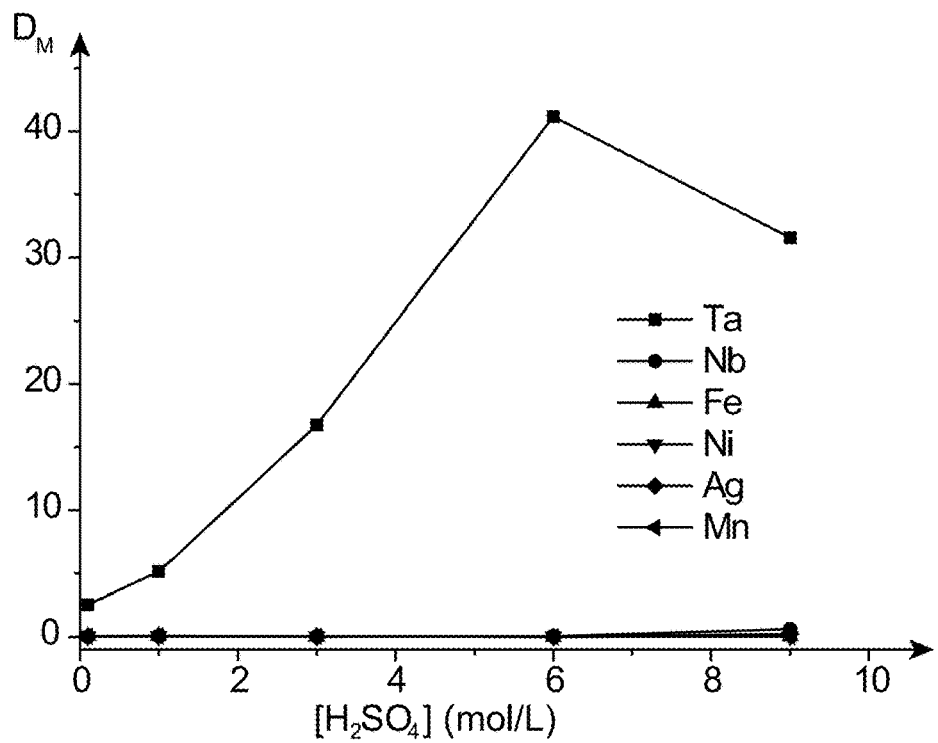
FIG. 7 illustrates the effect of the molar concentration of sulphuric acid of an aqueous phase A1 comprising Ta, Nb, Fe, Ni, Mn and Ag on the coefficient of distribution of each of these metals M (noted as $D_M$) when the extraction is carried out by means of a phase A2 consisting of [EBPip]NTf$_2$.

In reference to FIG. 7 in which are reported the values of the coefficients of distribution of the various metals M (Ta, Nb, Fe, Ni, Mn and Ag) according to the molar concentration of sulphuric acid, it is observed that the ionic liquid LI11 [EBPip]NTf$_2$ still has very good performance, even in the presence of other elements. Indeed, the coefficients of distribution D$_{Ta}$ are similar to those obtained with an aqueous phase A1 only comprising Ta (see table 5).

Figure 8:
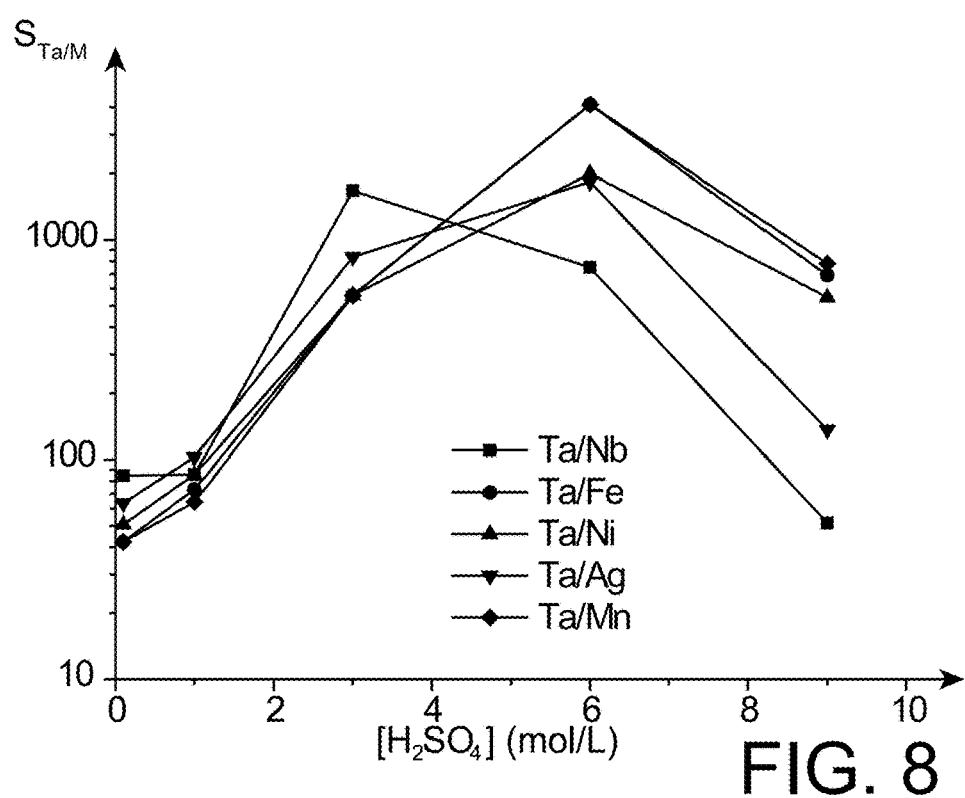
FIG. 8 illustrates the effect of the molar concentration of sulphuric acid of an aqueous phase A1 comprising Ta, Nb, Fe, Ni, Mn and Ag on the selectivity of the extraction of the Ta with respect to each of these metals M (noted as $S_{Ta/M}$) when the extraction is carried out by means of a phase A2 consisting of [EBPip]NTf$_2$.

In reference to FIG. 8 in which are reported the selectivity values S$_{Ta/M}$ for the Ta with respect to each of the other metals Nb, Fe, Ni, Mn and Ag also present in the aqueous phase A1 according to the molar concentration of sulphuric acid, it is observed that the ionic liquid LI11 [EBPip]NTf$_2$ remains very selective for the Ta, with values for S$_{Ta/M}$ ranging from 40 to 4000 according to the molar concentration of sulphuric acid and the metals considered.

This selectivity of the extraction of Ta with respect to the other metals by means of the ionic liquid LI11 is observed regardless of the molar concentration of sulphuric acid, as already observed with the ionic liquid L1 ([EPipMIBK]NTf$_2$).

5.3 In order to evaluate the ability of the ionic liquid LI11 [EBPip]NTf$_2$ to be able to be reused, recycling tests were carried out by bringing the following initial phases A1 and A2 into contact in equal volumes:

Aqueous phase A1: [Ta]=[Nb]=[Fe]=[Ni]=[Mn]=[Ag]=2 g/L, in variable concentrations of sulphuric acid ([H$_2$SO$_4$]=from 0.1M to 9M)

Phase A2: Ionic liquid: LI11

After a first cycle of extraction/stripping (cycle 1), the ionic liquid LI11 as obtained after the stripping is used for a second cycle of extraction/stripping (cycle 2) followed by a third (cycle 3).

Figure 9:
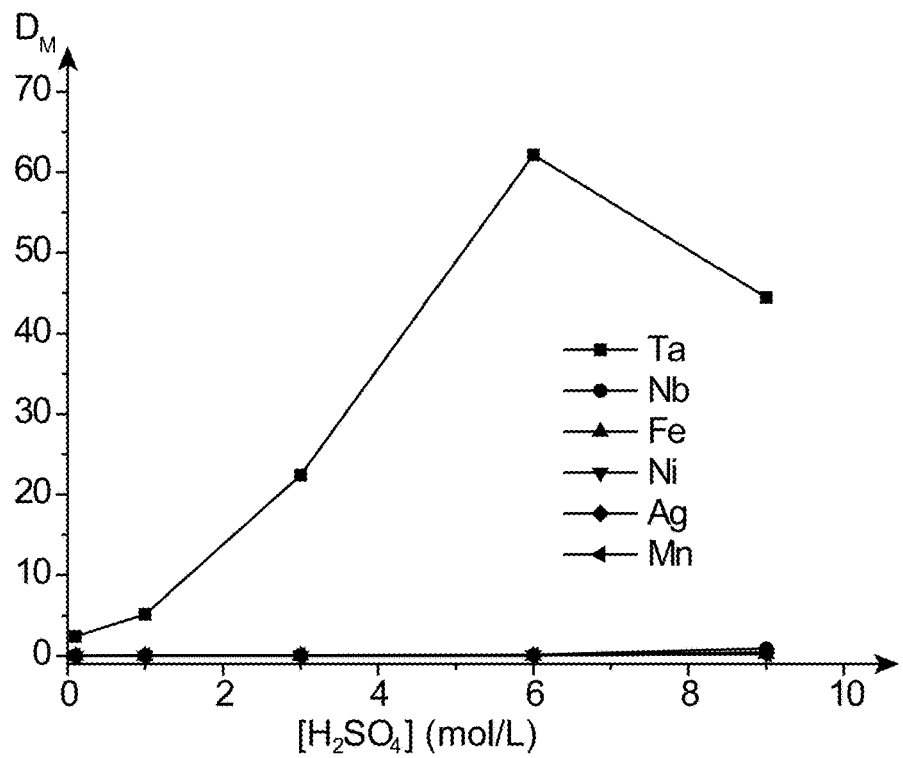
FIG. 9 illustrates the effect of the molar concentration of sulphuric acid of an aqueous phase A1 comprising Ta, Nb, Fe, Ni, Mn and Ag on the coefficient of distribution of each of these metals M (noted as $D_M$), after 3 cycles of extraction-stripping by means of an initial phase A2 consisting of [EBPip]NTf$_2$.
Figure 10:
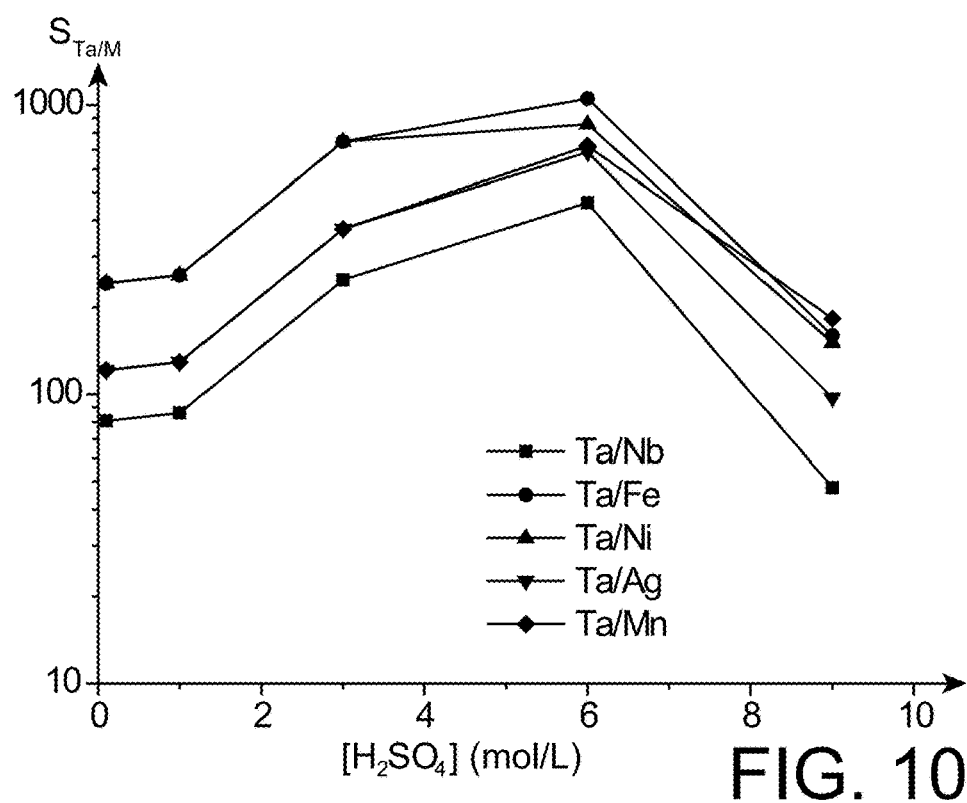
FIG. 10 illustrates the effect of the molar concentration of sulphuric acid of an aqueous phase A1 comprising Ta, Nb, Fe, Ni, Mn and Ag on the selectivity of the extraction of the Ta with respect to each of these metals M (noted as $S_{Ta/M}$), after 3 cycles of extraction-stripping by means of an initial phase A2 consisting of [EBPip]NTf$_2$.

The results of these recycling tests are illustrated in the appended FIGS. 9 and 10.

Example 6: Extraction by an Ionic Liquid Comprising a Phosphonate Function 6.1 A first series of extractions was carried out by bringing the following phases A1 and A2 into contact in equal volumes:

Aqueous phase A1: [Ta]=7 g/L, in sulphuric acid ([H$_2$SO$_4$]=6M)

Phase A2: Ionic liquid: LI10, [EPipBPhos]NTf$_2$

The calculated values for the coefficients of distribution of the tantalum D$_{Ta}$, as well as the percentages of extraction E (%) and of stripping Désex (%), after a first cycle of extraction/stripping (cycle 1) and then a second (cycle 2), are reported in table 6.1 below:

phosphonate function, since almost the entirety of the Ta can be extracted from the aqueous phase A1, the percentages of extraction being 99.4% and 99.6%. The percentages of stripping are also high (72% and 89%).

6.2 A second series of extractions was carried out by bringing the following phases A1 and A2 into contact, in volume ratios that vary between the phase A1 and the phase A2, as indicated in table 6.2 below:

Aqueous phase A1: [Ta]=7 g/L, in sulphuric acid ([H$_2$SO$_4$]=6M)

Phase A2: Ionic liquid: LI10, [EPipBPhos]NTf$_2$

The calculated values for the coefficients of distribution of the tantalum D$_{Ta}$, as well as the percentages of extraction E (%), are reported in table 6.2 below:

TABLE 6.2

| V$_{A1}$/V$_{A2}$ | D$_{Ta}$ | E (%) |
|---|---|---|
| 1 | 150 | 99.3 |
| 2 | 266 | 99.3 |
| 4 | 270 | 98.5 |
| 8 | 150 | 94.9 |
| 16 | 77 | 82.8 |

The results of table 6.2 show that this ionic liquid LI10 has an excellent ability to extract the tantalum. Thus, even in the case in which the volume of the aqueous phase A1 is sixteen times greater than that of the phase A2, LI10 allows up to 82.8% of Ta to be extracted, the aqueous phase A1 initially comprising 7 g/L of Ta.

6.3 In order to determine the performance of extraction of the Ta from an aqueous phase A1 comprising a plurality of metal elements, a third series of extractions was carried out by bringing the following phases A1 and A2 into contact in equal volumes:

Aqueous phase A1: [Ta]=[Nb]=[Fe]=[Ni]=[Mn]=[Ag]=2 g/L, in variable concentrations of sulphuric acid ([H$_2$SO$_4$]=from 0.1M to 9M)

Phase A2: Ionic liquid: LI10, [EPipBPhos]NTf$_2$

Figure 11:
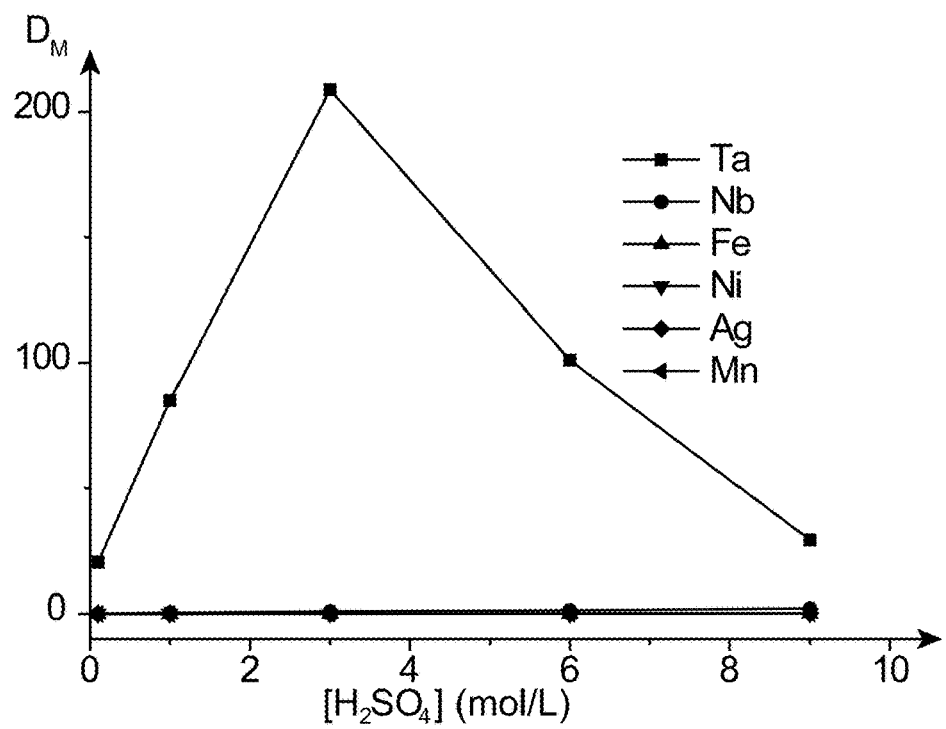
FIG. 11 illustrates the effect of the molar concentration of sulphuric acid of an aqueous phase A1 comprising Ta, Nb, Fe, Ni, Mn and Ag on the coefficient of distribution of each of these metals M (noted as $D_M$) when the extraction is carried out by means of a phase A2 consisting of [EPipBPhos]NTf$_2$.

In reference to FIG. 11, it is observed that the ionic liquid LI10 [EPipBPhos]NTf$_2$ allows an extraction of the Ta with particularly good performance to be obtained from the aqueous phase A1 comprising other elements.

Figure 12:
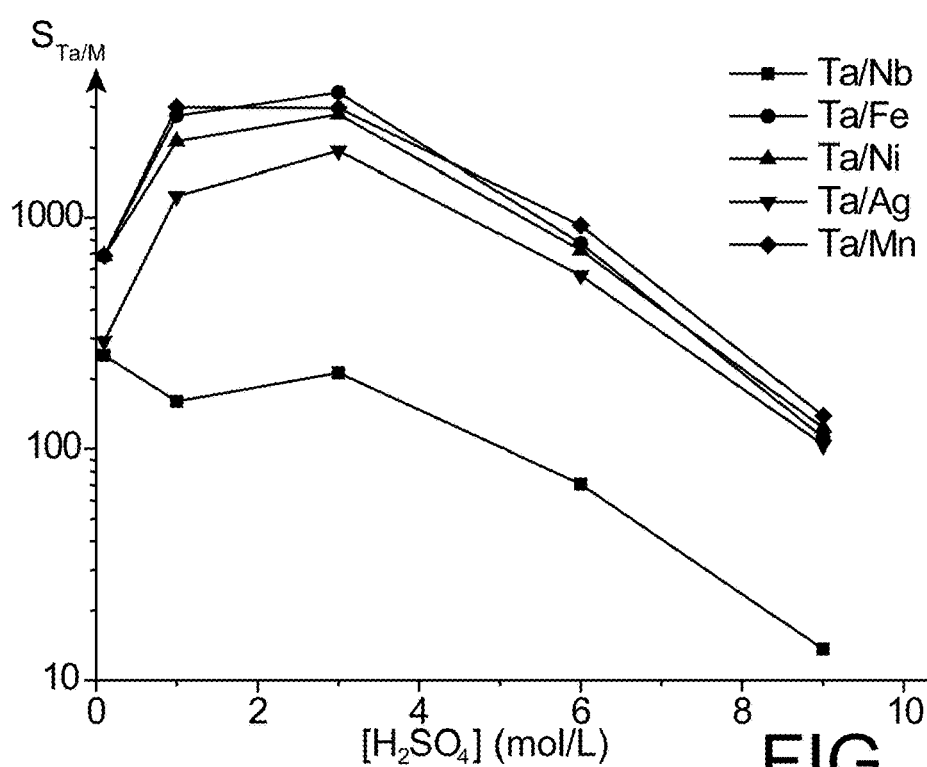
FIG. 12 illustrates the effect of the molar concentration of sulphuric acid of an aqueous phase A1 comprising Ta, Nb, Fe, Ni, Mn and Ag on the selectivity of the extraction of the Ta with respect to each of these metals M (noted as $S_{Ta/M}$) when the extraction is carried out by means of a phase A2 consisting of [EPipBPhos]NTf$_2$.

In reference to FIG. 12, it is observed that the ionic liquid LI10 [EPipBPhos]NTf$_2$ allows the Ta to be extracted in a very selective manner. Indeed, the values of S$_{Ta/M}$ are all greater than 100, regardless of the molar concentration of sulphuric acid, except with regard to Nb, for which the

TABLE 6.1

| | | Cycle 1 | | | Cycle 2 | |
|---|---|---|---|---|---|---|
| | Phase A2 | D$_{Ta}$ | E (%) | Désex (%) | D$_{Ta}$ | E (%) | Désex (%) |
| LI10 | [EPipBPhos]NTf$_2$ | 153 | 99.4 | 72 | 255 | 99.6 | 89 |

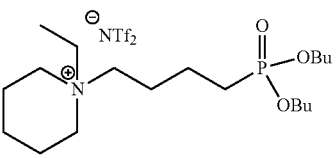

The values in this table 6.1 show the particularly high-performing properties of this ionic liquid LI10 comprising a selectivity S$_{Ta/Nb}$ decreases starting from a molar concentration of sulphuric acid of 6M.

6.4 In order to evaluate the ability of the ionic liquid LI10 [EPipBPhos]NTf$_2$ to be reused, recycling tests were carried out by bringing the following initial phases A1 and A2 into contact in equal volumes:

Aqueous phase A1: [Ta]=[Nb]=[Fe]=[Ni]=[Mn]=[Ag]=2 g/L, in variable concentrations of sulphuric acid ([H$_2$SO$_4$]=from 0.1M to 9M)

Phase A2: Ionic liquid: LI10, [EPipBPhos]NTf$_2$

After a first cycle of extraction/stripping (cycle 1), the ionic liquid LI10 as obtained after the stripping is used for a second cycle of extraction/stripping (cycle 2) followed by a third (cycle 3).

Figure 13:
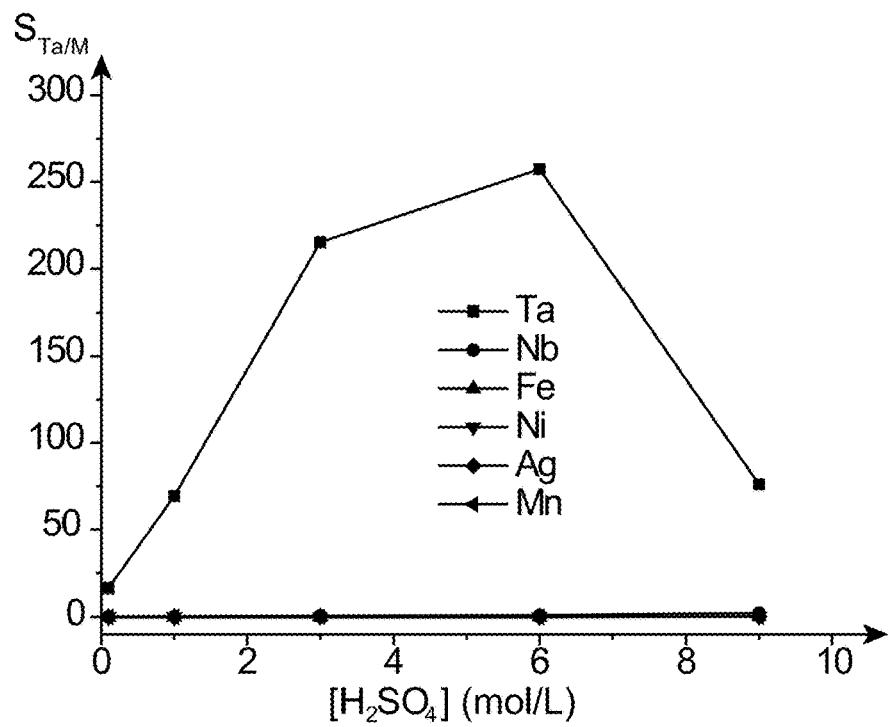
FIG. 13 illustrates the effect of the molar concentration of sulphuric acid of an aqueous phase A1 comprising Ta, Nb, Fe, Ni, Mn and Ag on the coefficient of distribution of each of these metals M (noted as $D_M$), after 3 cycles of extraction-stripping by means of an initial phase A2 consisting of [EPipBPhos]NTf$_2$.
Figure 14:
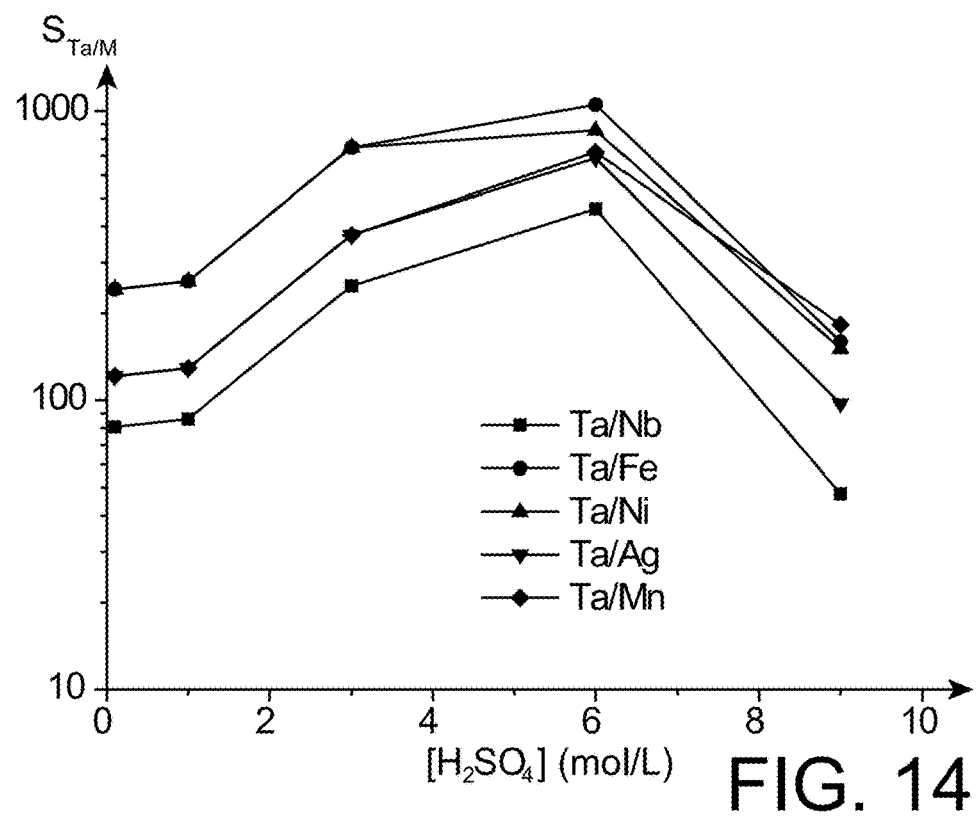
FIG. 14 illustrates the effect of the molar concentration of sulphuric acid of an aqueous phase A1 comprising Ta, Nb, Fe, Ni, Mn and Ag on the selectivity of the extraction of the Ta with respect to each of these metals M (noted as $S_{Ta/M}$), after 3 cycles of extraction-stripping by means of an initial phase A2 consisting of [EPipBPhos]NTf$_2$.

The results of these recycling tests are illustrated in the appended FIGS. 13 and 14.

Example 7: Extraction by a Mixture of Two Ionic Liquids

A series of extractions was carried out by bringing the following phases A1 and A2 into contact in equal volumes:

Aqueous phase A1: [Ta]=7 g/L, in sulphuric acid ([H$_2$SO$_4$]=6M)

Phase A2: Ionic liquids: LI1+LI11, [EPipMIBK]NTf$_2$+ [EBPip]NTf$_2$, in variable proportions specified in table 7 below The calculated values for the coefficients of distribution of the tantalum D$_{Ta}$, as well as the percentages of extraction E (%) and of stripping Désex (%), are reported in table 7 below:

TABLE 7

| Proportion of LI1 in LI11 (%) | D$_{Ta}$ | E (%) | Désex (%) |
|---|---|---|---|
| 1 | 38.3 | 97.5 | 75 |
| 2 | 40.2 | 97.6 | 70 |
| 10 | 40.9 | 97.6 | 68 |
| 20 | 37 | 97.4 | 75 |
| 50 | 36 | 97.3 | 75 |

According to the results of table 7, it is observed that regardless of the ratio of [EPipMIBK]NTf$_2$ in [EBPip]NTf$_2$, the percentages of extraction are substantially the same.

Example 8: Electrodeposition of the Tantalum

Three electrodeposition trials were carried out using the electrolytic solution formed by the phase A2 as obtained from the extraction described in paragraph 5.1 above and comprising the tantalum extracted in the ionic liquid LI11 [EBPip]NTf$_2$.

A cathode, a reference electrode and, as a working electrode, successively, a substrate made of aluminium, a substrate made of titanium and a substrate made of carbon were positioned in this electrolytic solution.

The reference electrode consists of a silver wire submerged in a solution of AgCF$_3$SO$_3$ (at 10 mmol/L) in the ionic liquid 1-butyl-3-methylimidazolium trifluoromethanesulfonate (BMICF$_3$SO$_3$).

Then, a difference in potential that ranges between −1.4V and −2.1V, according to the substrate tested, was applied between the cathode and the reference electrode.

In the particular case of the substrate made of aluminium, a difference in potential of −1.5V with respect to the reference electrode was applied, the electrolytic solution being maintained at a temperature of 110° C. The metal deposit obtained at the cathode is then rinsed with isopropanol and then water in order to be analysed.

This deposit was the subject of an image via a scanning electron microscope (SEM) as well as of an analysis with an energy dispersive X-ray spectrometry probe (abbreviated EDX) in order to determine its chemical composition.

Figure 15A:
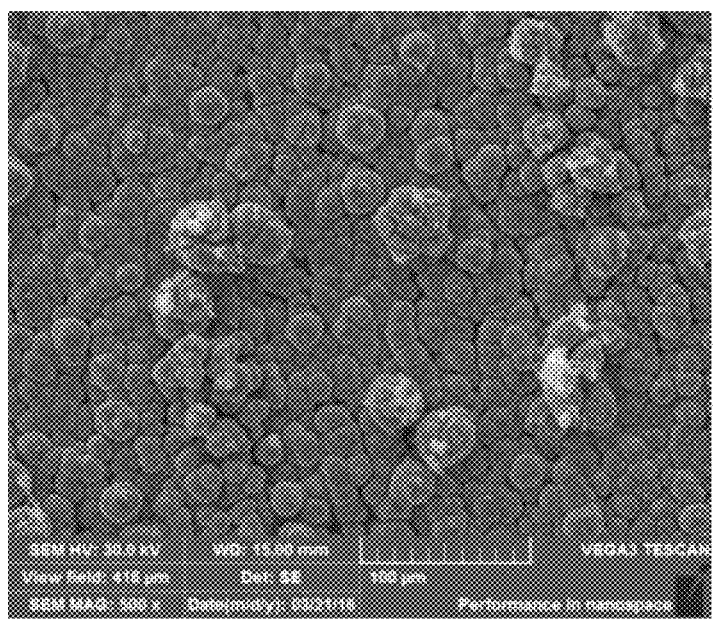
FIG. 15A corresponds to an SEM image of the metal deposit obtained at the cathode in example 8 carried out with a substrate made of aluminium, while FIG. 15B corresponds to the EDX analysis of this same deposit.
Figure 15B:
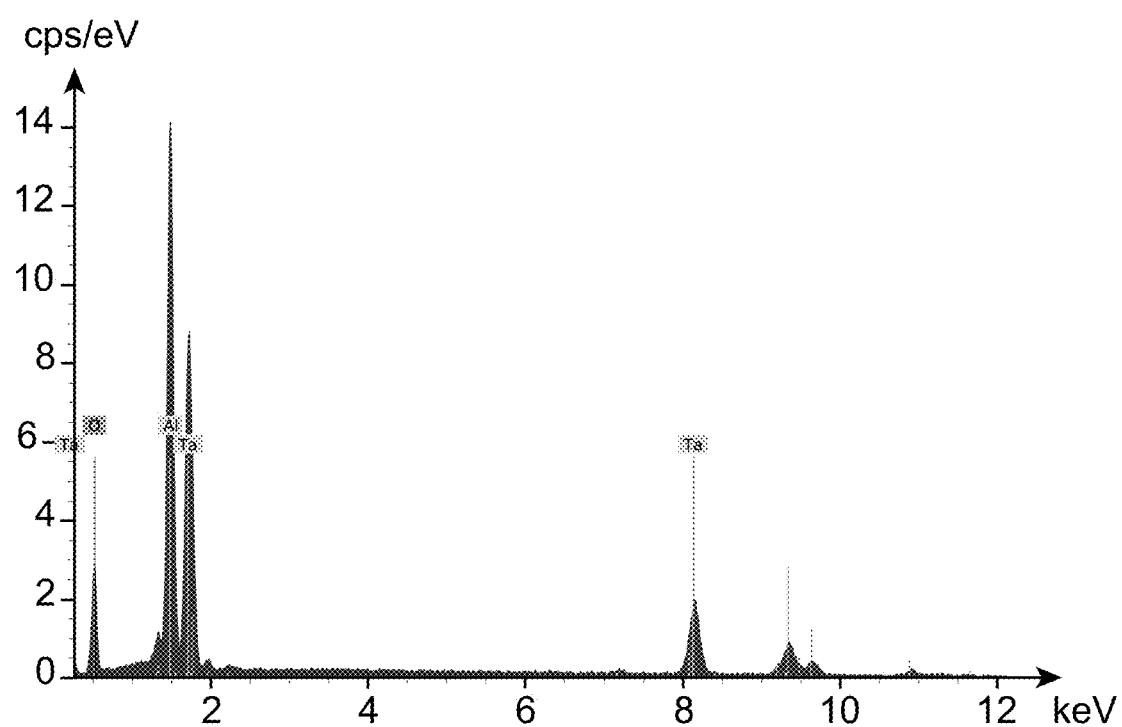

The results of this SEM image and EDX analysis, presented in FIGS. 15A and 15B, respectively, show that this deposit is adherent, homogenous, compact, that it has a thickness greater than 10 μm and that it consists of grains having a diameter of several microns. As shown by the EDX spectrum (FIG. 15B), this deposit mainly consists of tantalum and does not comprise any traces of sulphur and/or fluorine that could have come from a reaction between the tantalum and the ionic liquid LI11 [EBPip]NTf$_2$.

A deposit of tantalum in its metallic form is also observed for the trials carried out with each of the other substrates made of titanium and of carbon.

What is claimed is:

1. Method for extracting tantalum from an acid aqueous phase A1 comprising at least one step comprising contacting an aqueous phase A1 with a phase A2 that is not miscible with water, and then separating the aqueous phase A1 from the phase A2, wherein the phase A2 consists of one ionic liquid or a mixture of ionic liquids as an extractant, and the aqueous phase A1 is an acid digestion solution of a concentrate of a natural or urban ore comprising said tantalum.

2. Extraction method according to claim 1, wherein the phase A2 consists of one ionic liquid.

3. Extraction method according to claim 1, wherein the ionic liquid or the ionic liquids comprise an organic cation and an anion, said organic cation comprises a nitrogen group chosen from the group consisting of a quaternary ammonium, a phosphonium, a piperidinium, a pyridinium, a pyrrolidinium, a piperazinium and an imidazolium.

4. Extraction method according to claim 3, wherein the organic cation is chosen from the group consisting of a piperidinium, a pyridinium, a pyrrolidinium, a piperazinium and an imidazolium.

5. Extraction method according to claim 4, wherein the organic cation is chosen from the group consisting of a dialkylpiperidinium, an alkylpyridinium, an N,N'-dialkylpiperazinium and an N,N'-dialkylimidazolium.

6. Extraction method according to claim 3, wherein the organic cation further comprises at least one functional group chosen from the group consisting of a ketone, an alcohol, a phosphonate and a phosphine oxide.

7. Extraction method according to claim 6, wherein the functional group is a phosphonate.

8. Extraction method according to claim 3, wherein the anion is chosen from bis-(trifluoromethanesulfonyl)imide, hexafluorophosphate and bis-(fluorosulfonyl)imide.

9. Extraction method according to claim 8, wherein the ionic liquid is chosen from:
N-ethyl-N-(4-methyl-2-oxopentyl)-piperidinium bis-(trifluoromethanesulfonyl)imide,
N-methyl-N-(4-methyl-2-oxopentyl)imidazolium bis-(trifluoromethanesulfonyl)imide,
N-(4-methyl-2-oxopentyl)pyridinium bis-(trifluoromethanesulfonyl)imide,
(4-(dibutoxyphosphoryl)-butyl)ethylpiperidinium bis-(trifluoromethanesulfonyl)imide,
ethylbutylpiperidinium bis-(trifluoromethanesulfonyl) imide, and
methylimidazolium bis-(trifluoromethanesulfonyl)imide.

10. Extraction method according to claim 1, carried out at ambient temperature.

11. Method for recovering the tantalum present in an acid aqueous phase A1, characterised in that it comprises:
(a) extracting tantalum from the aqueous phase A1 by the extraction method according to claim 1; and
(b) stripping said tantalum present in the phase A2 as obtained after step (a), or
(b') electrodepositing said tantalum present in the phase A2 as obtained after step (a).

12. Recovery method according to claim 11, wherein the step (b) of stripping comprises contacting the phase A2 with an aqueous phase A3 having a pH that is less than or equal to 7, and then separating the phase A2 from the aqueous phase A3.

13. Recovery method according to claim 11, wherein the step (b') of electrodeposition involves applying a difference in potential between a cathode and a reference electrode, in the presence of a working electrode, all of these electrodes being placed in this phase A2, between −0.8 V and −2.4 V.

14. Extraction method according to claim 1, wherein the aqueous phase A1 comprises at least one inorganic acid chosen from the group consisting of hydrofluoric acid, sulphuric acid, nitric acid, phosphoric acid and hydrochloric acid.

15. Extraction method according to claim 14, wherein the aqueous phase A1 has a total molar concentration of inorganic acid(s) of at least 0.1 mol/L.

16. Recovery method according to claim 11, wherein the aqueous phase A1 comprises at least one inorganic acid chosen from the group consisting of hydrofluoric acid, sulphuric acid, nitric acid, phosphoric acid and hydrochloric acid.

17. Recovery method according to claim 16, wherein the aqueous phase A1 has a total molar concentration of inorganic acid(s) of at least 0.1 mol/L.

18. Extraction method according to claim 8, wherein the anion is bis-(trifluoromethanesulfonyl)imide.

19. Extraction method according to claim 15, wherein the aqueous phase A1 has a total molar concentration of inorganic acid(s) of from 1 mol/L to 14 mol/L.

20. Extraction method according to claim 19, wherein the aqueous phase A1 has a total molar concentration of inorganic acid(s) of from 3 mol/L to 9 mol/L.

21. Recovery method according to claim 17, wherein the aqueous phase A1 has a total molar concentration of inorganic acid(s) of from 1 mol/L to 14 mol/L.

22. Recovery method according to claim 21, wherein the aqueous phase A1 has a total molar concentration of inorganic acid(s) of from 3 mol/L to 9 mol/L.

23. Method for extracting tantalum from an acid aqueous phase A1, comprising: providing an ionic liquid or a mixture of ionic liquids as an extractant, said ionic liquid(s) comprising an organic cation and an anion, said organic cation comprising a nitrogen group chosen from the group consisting of a piperidinium, a pyridinium, a pyrrolidinium, a piperazinium and an imidazolium.

24. Extraction method according to claim 23, wherein the organic cation is chosen from the group consisting of a dialkylpiperidinium, an alkylpyridinium, an N,N'-dialkylpiperazinium and an N,N'-dialkylimidazolium.

25. Extraction method according to claim 23, wherein the organic cation further comprises at least one functional group chosen from a ketone, an alcohol, a phosphonate and a phosphine oxide.

26. Extraction method according to claim 23, wherein the anion is bis-(trifluoromethanesulfonyl)imide.

27. Extraction method according to claim 23, wherein the extraction is carried out via the technique of liquid-liquid extraction.

* * * * *